(12) United States Patent
Yamaguchi et al.

(10) Patent No.: US 10,508,416 B2
(45) Date of Patent: Dec. 17, 2019

(54) SHAPE MEASURING SYSTEM AND SHAPE MEASURING METHOD

(71) Applicant: Komatsu Ltd., Tokyo (JP)

(72) Inventors: Hiroyoshi Yamaguchi, Tokyo (JP); Taiki Sugawara, Tokyo (JP); Shun Kawamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/756,673

(22) PCT Filed: Oct. 5, 2016

(86) PCT No.: PCT/JP2016/079701
§ 371 (c)(1),
(2) Date: Mar. 1, 2018

(87) PCT Pub. No.: WO2017/061511
PCT Pub. Date: Apr. 13, 2017

(65) Prior Publication Data
US 2018/0245314 A1    Aug. 30, 2018

(30) Foreign Application Priority Data

Oct. 5, 2015   (JP) .................... 2015-198078

(51) Int. Cl.
*E02F 9/26*         (2006.01)
*G01C 11/06*        (2006.01)
(Continued)

(52) U.S. Cl.
CPC .................. *E02F 9/26* (2013.01); *B60R 1/00* (2013.01); *E02F 9/261* (2013.01); *E02F 9/264* (2013.01);
(Continued)

(58) Field of Classification Search
CPC ... E02F 9/26; E02F 9/261; E02F 9/264; E02F 9/268; B60R 2300/00; B60R 2300/105; B60R 2300/107; G06T 17/05; G01C 11/06
See application file for complete search history.

(56) References Cited

U.S. PATENT DOCUMENTS 5,471,391 A * 11/1995 Gudat .................. E01C 19/004
                                                    340/995.1
5,907,111 A *  5/1999 Josten ..................... E02F 9/264
                                                    73/866.5
(Continued)

FOREIGN PATENT DOCUMENTS

JP        09-021620 A    1/1997
JP        H10-332825 A   12/1998
(Continued)

OTHER PUBLICATIONS

International Search Report dated Dec. 13, 2016, issued for PCT/JP2016/079701.

*Primary Examiner* — Robert J Hance
(74) *Attorney, Agent, or Firm* — Locke Lord LLP

(57) ABSTRACT

A shape measuring system includes an object detection unit attached to a work machine and configured to detect an object and output information of the object, a shape detection unit configured to output shape information representing a three-dimensional shape of the object by using the information of the object detected by the object detection unit, and an information providing unit configured to attach time information for specifying the shape information to the shape information and output the shape information.

12 Claims, 15 Drawing Sheets

(51) Int. Cl.
*H04N 13/282* (2018.01)
*B60R 1/00* (2006.01)
*G06T 7/593* (2017.01)
*G06T 7/73* (2017.01)
*E02F 3/32* (2006.01)

(52) U.S. Cl.
CPC ............ *G01C 11/06* (2013.01); *H04N 13/282* (2018.05); *B60R 2300/105* (2013.01); *B60R 2300/107* (2013.01); *B60R 2300/303* (2013.01); *E02F 3/32* (2013.01); *G06T 7/596* (2017.01); *G06T 7/73* (2017.01); *G06T 2207/10012* (2013.01); *G06T 2207/30252* (2013.01)

(56) References Cited

U.S. PATENT DOCUMENTS

| | | | | |
|---|---|---|---|---|
| 5,996,702 | A * | 12/1999 | Hall | E02F 9/26 172/4.5 |
| 6,191,732 | B1 * | 2/2001 | Carlson | E02F 3/842 342/357.3 |
| 2004/0158355 | A1 * | 8/2004 | Holmqvist | G05D 1/0236 700/245 |
| 2005/0104999 | A1 | 5/2005 | Wada et al. | |
| 2006/0064273 | A1 | 3/2006 | Sugiura et al. | |
| 2009/0202109 | A1 * | 8/2009 | Clar | G01C 15/00 382/104 |
| 2012/0133918 | A1 | 5/2012 | Sakimura et al. | |
| 2014/0324291 | A1 * | 10/2014 | Jones | E02F 9/2045 701/41 |
| 2015/0094953 | A1 * | 4/2015 | Montgomery | G06K 9/00671 701/514 |
| 2016/0094806 | A1 * | 3/2016 | Hasejima | G06K 9/00201 348/46 |

FOREIGN PATENT DOCUMENTS

| | | |
|---|---|---|
| JP | 2002-294762 A | 10/2002 |
| JP | 2002-328022 A | 11/2002 |
| JP | 2003-240525 A | 8/2003 |
| JP | 2004-222051 A | 8/2004 |
| JP | 2005-092121 A | 4/2005 |
| JP | 2012-117874 A | 6/2012 |
| JP | 2012-255286 A | 12/2012 |
| JP | 2013-036243 A | 2/2013 |
| JP | 2014-153351 A | 8/2014 |
| JP | 2015-055606 A | 3/2015 |
| JP | 2015-102466 A | 6/2015 |
| WO | 2013/047697 A1 | 4/2013 |

* cited by examiner 51, 52, 53, 54, 55, 56, 57, 58, 61, 23, 25

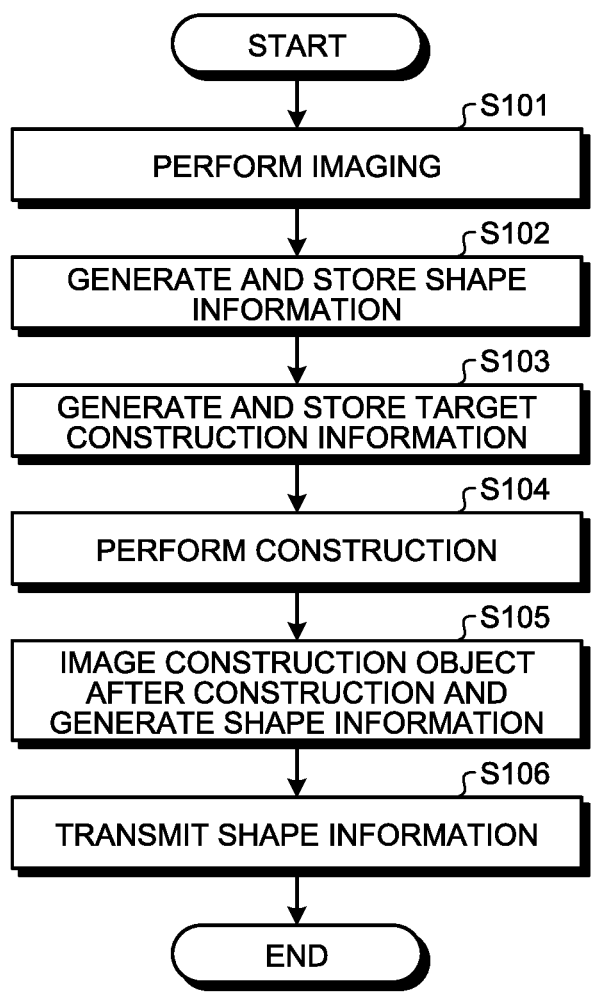

SHAPE MEASURING SYSTEM AND SHAPE MEASURING METHOD

FIELD

The present invention relates to a shape measuring system and a shape measuring method.

BACKGROUND

There is a work machine including an imaging device. Patent Literature 1 describes a technology of creating construction plan image data on the basis of construction plan data stored in a storage unit and position information of a stereo camera, superimposing the construction plan image data and current state image data imaged by the stereo camera, and three-dimensionally displaying the superimposed composite image in a three-dimensional display device.

CITATION LIST

Patent Literature

Patent Document 1: Japanese Laid-open Patent Publication No. 2013-036243

SUMMARY

Technical Problem

In a case of mounting a detection device that detects an object position to a work machine and measuring a construction site, and using a measurement result for management of a construction situation or the like, measurement results obtained at different timing or a measurement result obtained in a state where the posture of the work machine is substantially changed is sometimes used. Further, a construction site has change in landform associated with construction. In a case of detection with the detection device, the inclination of the ground may differ if measuring time is different even in the same place. Management of the construction situation using the measurement results obtained in various situations by the work machine including the detection device, as described above, is not suggested in Patent Literature 1 and there is room for improvement.

An objective of the present invention is to manage a construction situation, using detection results obtained by a work machine including a detection device that detects a position of an object.

Solution to Problem

According to an aspect of the present invention, a shape measuring system comprises: an object detection unit attached to a work machine and configured to detect an object and output information of the object; a shape detection unit configured to output shape information representing a three-dimensional shape of the object by using the information of the object detected by the object detection unit; and an information providing unit configured to provide time information for specifying the shape information to the shape information.

It is preferable that the time information includes information of at least one time existing from a time when the object has been detected by the object detection unit to a time when an external device of the work machine has acquired the output shape information.

It is preferable that the information providing unit is configured to further output information indicating a position of the object detection unit and information for identifying the object detection unit.

It is preferable that the shape detection unit and the information providing unit are provided in the work machine.

It is preferable that the work machine includes a posture detection unit configured to output a posture of the work machine, and the shape detection unit and the object detection unit are attached to the work machine, and the shape information is obtained by using the posture of the work machine of when the object detection unit has detected the object, the posture having been detected by the posture detection unit.

It is preferable that the work machine includes a position detection unit configured to detect an azimuth of the work machine, and the shape detection unit is configured to obtain the shape information by further using the azimuth of the work machine of when the shape detection unit has detected the object, the azimuth having been detected by the position detection device.

It is preferable that information of a landform of a current situation of an entire construction site of the work machine is output by using the shape information to which the time information is attached.

It is preferable that the shape measuring system further comprises: a display device configured to chronologically display information of a landform of an entire construction site of the work machine by using a plurality of pieces of the shape information to which the time information is attached.

According to an aspect of the present invention, A shape measuring system comprises: an object detection unit attached to a work machine and configured to detect an object and output information of the object; a shape detection unit configured to output shape information representing a three-dimensional shape of the object by using the information of the object detected by the object detection unit; and a posture detection unit configured to output a posture of the work machine, wherein the shape detection unit is configured to obtain the shape information by using the posture of the work machine of when the shape detection unit has detected the object, the posture having been detected by the posture detection unit.

It is preferable that the work machine includes a position detection unit configured to detect an azimuth of the work machine, and the shape detection unit is configured to obtain the shape information by further using the azimuth of the work machine of when the shape detection unit has detected the object, the azimuth having been detected by the position detection device.

It is preferable that the shape detection unit is provided in the work machine.

According to an aspect of the present invention, a shape measuring method comprises: detecting an object from a predetermined position of a work machine; and obtaining shape information representing a three-dimensional shape of the detected object by using information of the detected object and a posture of the work machine of when the object has been detected.

It is preferable that the shape measuring method further comprises: attaching time information for specifying the shape information to the obtained shape information and outputting the shape information.

Advantageous Effects of Invention

The present invention can manage a construction situation, using detection results obtained by a work machine including a detection device that detects a position of an object.

BRIEF DESCRIPTION OF DRAWINGS

FIG. 20 is a flowchart illustrating a processing example of a shape measuring method, a shape measuring method, and a construction managing method according to the embodiment.

DESCRIPTION OF EMBODIMENTS

Forms for carrying out the present invention (embodiments) will be described in detail with reference to the drawings.

<Overall Configuration of Excavator>

Figure 1:
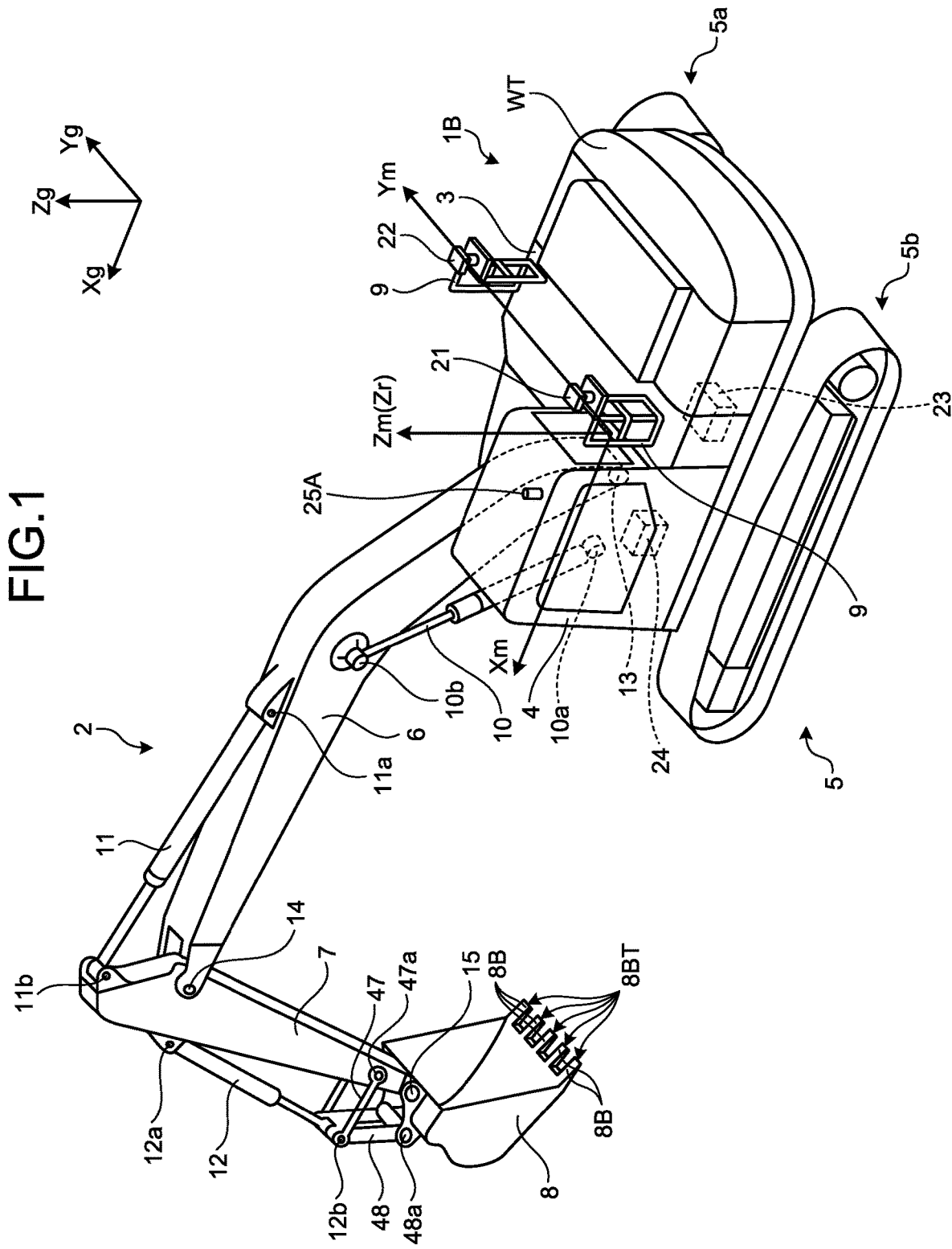
FIG. 1 is a perspective view illustrating an excavator 1 provided with a control system of an imaging device according to an embodiment.
Figure 2:
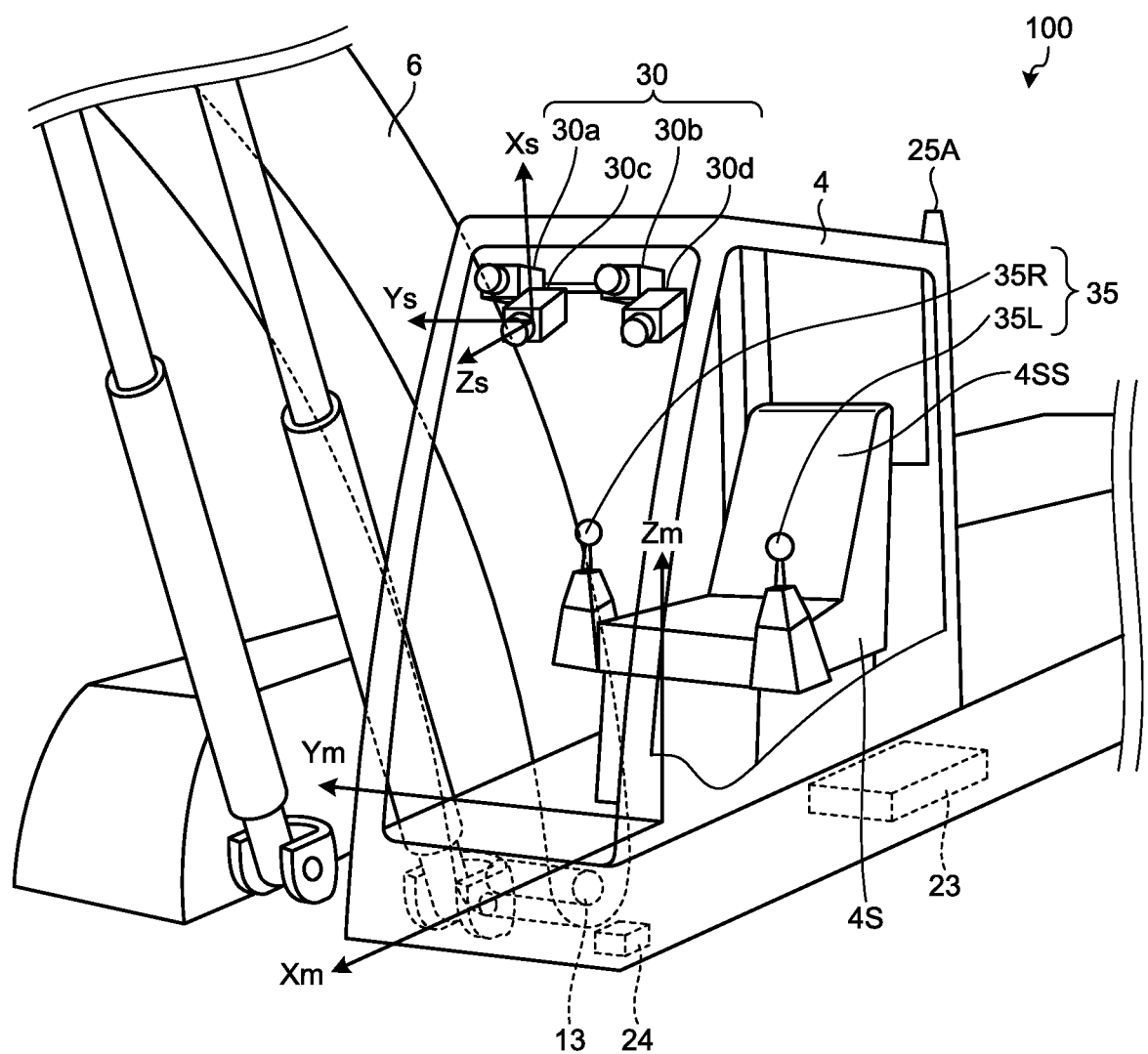
FIG. 2 is a perspective view of a vicinity of a driver's seat of the excavator according to the embodiment.

FIG. 1 is a perspective view illustrating an excavator 1 provided with a control system for an imaging device according to an embodiment. FIG. 2 is a perspective view of a vicinity of a driver's seat of the excavator 1 according to the embodiment. The excavator 1 as a work machine has a vehicle body 1B and a work device 2. The vehicle body 1B includes a swing body 3, a driver's cab 4, and a traveling body 5. The swing body 3 is swingably mounted to the traveling body 5 around a swing center axis Zr. The swing body 3 accommodates devices such as a hydraulic pump and an engine.

The swing body 3 swings with the work device 2 attached thereto. A handrail 9 is attached to an upper portion of the swing body 3. Antennas 21 and 22 are attached to the handrails 9. Antennas 21 and 22 are antennas for real time kinematic-global navigation satellite systems (RTK-GNSS, GNSS is a global navigation satellite system). The antennas 21 and 22 are disposed apart from each other by a predetermined distance along a direction of a Ym axis of a vehicle body coordinate system (Xm, Ym, Zm). The antennas 21 and 22 receive GNSS radio waves and output signals corresponding to the received GNSS radio waves. The antennas 21 and 22 may be global positioning system (GPS) antennas.

The driver's cab 4 is mounted on a front portion of the swing body 3. A communication antenna 25A is attached to a roof of the driver's cab 4. The traveling body 5 has crawler belts 5a and 5b. As the crawler belts 5a and 5b rotate, the excavator 1 travels.

The work device 2 is attached to a front portion of the vehicle body 1B, and includes a boom 6, an arm 7, a bucket 8 as a work implement, a boom cylinder 10, an arm cylinder 11 and a bucket cylinder 12. In the embodiment, the front side of the vehicle body 1B is a direction side from a backrest 4SS of a driver's seat 4S toward an operation device 35 illustrated in FIG. 2. The rear side of the vehicle body 1B is a direction side from the operation device 35 toward the backrest 4SS of the driver's seat 4S. The front portion of the vehicle body 1B is a portion on the front side of the vehicle body 1B and is a portion on the opposite side of a counterweight WT of the vehicle body 1B. The operation device 35 is a device for operating the work device 2 and the swing body 3, and includes a right-side lever 35R and a left-side lever 35L.

A base end portion of the boom 6 is rotatably attached to the front portion of the vehicle body 1B via a boom pin 13. That is, the boom pin 13 corresponds to a rotation center of the boom 6 with respect to the swing body 3. A base end portion of the arm 7 is rotatably attached to a tip end portion of the boom 6 via an arm pin 14. That is, the arm pin 14 corresponds to a rotation center of the arm 7 with respect to the boom 6. The bucket 8 is rotatably attached to a tip end portion of the arm 7 via a bucket pin 15. That is, the bucket pin 15 corresponds to a rotation center of the bucket 8 with respect to the arm 7.

The boom cylinder 10, the arm cylinder 11 and the bucket cylinder 12 illustrated in FIG. 1 are hydraulic cylinders driven by hydraulic pressure, respectively. A base end portion of the boom cylinder 10 is rotatably attached to the swing body 3 via a boom cylinder foot pin 10*a*. A tip end portion of the boom cylinder 10 is rotatably attached to the boom 6 via a boom cylinder top pin 10*b*. The boom cylinder 10 expands and contracts by hydraulic pressure to drive the boom 6.

A base end portion of the arm cylinder 11 is rotatably attached to the boom 6 via an arm cylinder foot pin 11*a*. A tip end portion of the arm cylinder 11 is rotatably attached to the arm 7 via an arm cylinder top pin lib. The arm cylinder 11 expands and contracts by hydraulic pressure to drive the arm 7.

A base end portion of the bucket cylinder 12 is rotatably attached to the arm 7 via a bucket cylinder foot pin 12*a*. A distal end portion of the bucket cylinder 12 is rotatably attached to one end of a first link member 47 and one end of a second link member 48 via a bucket cylinder top pin 12*b*. The other end of the first link member 47 is rotatably attached to the tip end portion of the arm 7 via a first link pin 47*a*. The other end of the second link member 48 is rotatably attached to the bucket 8 via a second link pin 48*a*. The bucket cylinder 12 expands and contracts by hydraulic pressure to drive the bucket 8.

The bucket 8 has a plurality of blades 8B. The plurality of blades 8B is aligned along a width direction of the bucket 8. A tip end of the blade 8B is a cutting edge 8BT. The bucket 8 is an example of a work implement. The work implement is not limited to the bucket 8. The work implement may be, for example, a tilt bucket having a single blade, a rock drill attachment having a slope bucket or a rock drill chip, or any other implement.

The swing body 3 includes a position detection device 23 and an inertial measurement unit (IMU) 24 as an example of a posture detection device. Signals from the antennas 21 and 22 are input to the position detection device 23. The position detection device 23 detects current positions of the antennas 21 and 22 and an azimuth of the swing body 3 in a global coordinate system (Xg, Yg, Zg) using the signals acquired from the antennas 21 and 22, and outputs detected results. The azimuth of the swing body 3 represents an orientation of the swing body 3 in the global coordinate system. The orientation of the swing body 3 can be expressed by, for example, a front-rear direction of the swing body 3 around the Zg axis of the global coordinate system. An azimuth angle is a rotation angle around the Zg axis of the global coordinate system, of a reference axis in the front-rear direction of the swing body 3. The azimuth of the swing body 3 is represented by the azimuth angle. In the embodiment, the position detection device 23 calculates the azimuth angle from relative positions of the two antennas 21 and 22.

<Imaging Device>

As illustrated in FIG. 2, the excavator 1 includes a plurality of imaging devices 30*a*, 30*b*, 30*c*, and 30*d* in the driver's cab 4. The plurality of imaging devices 30*a*, 30*b*, 30*c*, and 30*d* is an example of a detection device that detects the shape of an object. Hereinafter, in a case where the plurality of imaging devices 30*a*, 30*b*, 30*c*, and 30*d* is not distinguished from one another, the imaging devices are referred to as imaging devices 30 as appropriate. The imaging device 30*a* and the imaging device 30*c*, of the plurality of imaging devices 30, are disposed on the work device 2 side. The type of the imaging device 30 is not limited. However, in the embodiment, an imaging device including a couple charged device (CCD) image sensor or a complementary metal oxide semiconductor (CMOS) image sensor is used.

As illustrated in FIG. 2, the imaging device 30*a* and the imaging device 30*b* are arranged at a predetermined interval, facing the same direction or different directions, in the driver's cab 4. The imaging device 30*c* and the imaging device 30*d* are arranged at a predetermined interval, facing the same direction or different directions, in the driver's cab 4. Two of the imaging devices 30*a*, 30*b*, 30*c*, and 30*d* are combined to form a stereo camera. In the embodiment, a stereo camera of a combination of the imaging devices 30*a* and 30*b* and a stereo camera of a combination of the imaging devices 30*c* and 30*d* are configured. In the embodiment, the imaging device 30*a* and the imaging device 30*b* face upward, and the imaging device 30*c* and the imaging device 30*d* face downward. At least the imaging device 30*a* and the imaging device 30*c* face the front of the excavator 1, in the embodiment, the front of the swing body 3. The imaging device 30*b* and the imaging device 30*d* may be slightly directed to the work device 2, that is, arranged slightly toward the side of the imaging device 30*a* and the imaging device 30*c*.

In the embodiment, the excavator 1 includes the four imaging devices 30. However, the number of the imaging devices 30 included in the excavator 1 is at least two and is not limited to four. This is because the excavator 1 has at least one pair of the imaging devices 30 configure the stereo camera, and stereoscopically captures an object.

The plurality of imaging devices 30*a*, 30*b*, 30*c*, and 30*d* is disposed in front of and above the driver's cab 4. Upward is a direction side orthogonal to a ground plane of the crawler belts 5*a* and 5*b* held by the excavator 1 and away from the ground plane. The ground plane of the crawler belts 5*a* and 5*b* is a plane defined by at least three points not existing on the same straight line, of a portion where at least one of the crawler belts 5*a* and 5*b* is in contact. Downward is a direction side opposite to upward, that is, a direction side orthogonal to the ground plane of the crawler belts 5*a* and 5*b* and heading to the ground plane.

The plurality of imaging devices 30*a*, 30*b*, 30*c*, and 30*d* stereoscopically captures an object existing in front of the vehicle body 1B of the excavator 1. The object is, for example, a construction object for at least one of the excavator 1, the work machine of the excavator 1, and an operator who works at a construction side. The plurality of imaging devices 30*a*, 30*b*, 30*c*, and 30*d* detects the object from a predetermined position of the excavator 1, that is, from in front of and above the driver's cab 4 in the embodiment. In the embodiment, the object is three-dimensionally measured using a result of stereo capturing by at least a pair of the imaging devices 30. The places where the plurality of imaging devices 30*a*, 30*b*, 30*c*, and 30*d* is disposed are not limited to the front and above the driver's cab 4.

The imaging device 30*c*, of the plurality of imaging devices 30*a*, 30*b*, 30*c*, and 30*d*, is set as a reference for the imaging devices, for example. Each of the four imaging devices 30*a*, 30*b*, 30*c*, and 30*d* has a coordinate system. These coordinate systems are appropriately referred to as imaging device coordinate systems. FIG. 2 illustrates only a coordinate system (xs, ys, zs) of the imaging device 30*c* as a reference. The origin of the imaging device coordinate system is the center of each of the imaging devices 30*a*, 30*b*, 30*c*, and 30*d*.

In the embodiment, imaging ranges of the imaging devices 30a, 30b, 30c, and 30d are larger than a range that can be constructed by the work device 2 of the excavator 1. In this manner, each of the imaging devices 30a, 30b, 30c, and 30d can reliably stereoscopically capture the object in the range that can be excavated by the work device 2.

The above-described vehicle body coordinate system (Xm, Ym, Zm) is a coordinate system based on the origin fixed to the vehicle body 1B, to the swing body 3 in the embodiment. In the embodiment, the origin of the vehicle body coordinate system (Xm, Ym, Zm) is, for example, the center of a swing circle of the swing body 3. The center of the swing circle exists on the swing center axis Zr of the swing body 3. A Zm axis of the vehicle body coordinate system (Xm, Ym, Zm) is an axis serving as the swing center axis Zr of the swing body 3, and an Xm axis is an axis extending in the front-rear direction of the swing body 3 and orthogonal to the Zm axis. The Xm axis is a reference axis in the front-rear direction of the swing body 3. The Ym axis is an axis extending in a width direction of the swing body 3 and orthogonal to the Zm axis and the Xm axis. The above global coordinate system (Xg, Yg, Zg) is a coordinate system measured by GNSS and is a coordinate system based on the origin fixed to the earth.

The vehicle body coordinate system is not limited to the example of the embodiment. In the vehicle body coordinate system, the center of the boom pin 13 may be set as the origin of the vehicle body coordinate system. The center of the boom pin 13 is a center of a cross section of when the boom pin 13 is cut in a plane orthogonal to a direction into which the boom pin 13 extends and is a center in the direction into which the boom pin 13 extends.

<Control System of Work Machine and Construction Management System>

Figure 3:
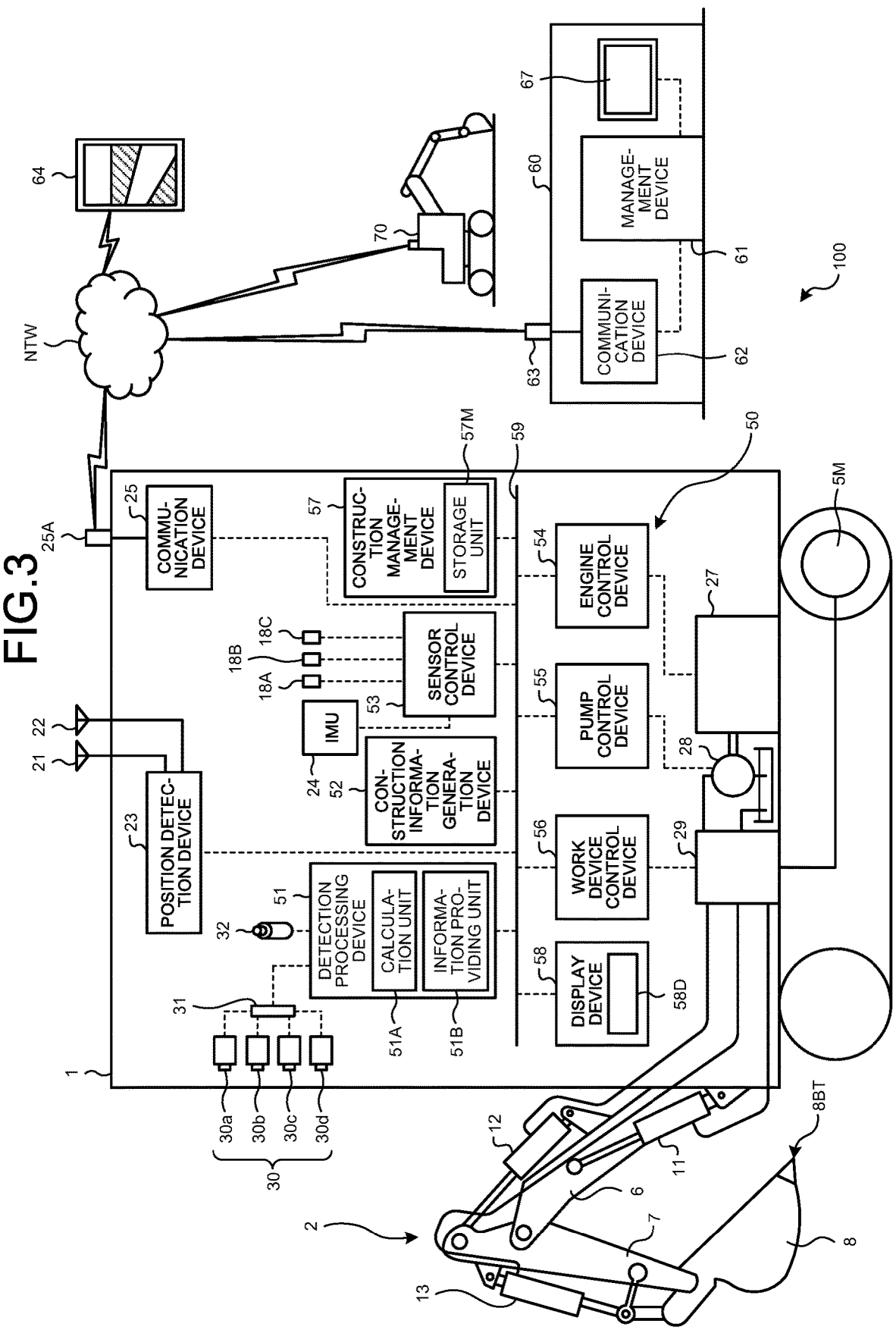
FIG. 3 is a diagram illustrating a control system of a work machine and a construction management system according to the embodiment.

FIG. 3 is a diagram illustrating a control system 50 of a work machine and a construction management system 100 according to the embodiment. Device configurations of the control system 50 and the management system 100 illustrated in FIG. 3 are merely examples, and are not limited to the device configuration example of the embodiment. For example, the various devices included in the control system 50 may not be independent of one another. That is, functions of the plurality of devices may be realized by one device.

The control system 50 of the work machine (hereinafter, appropriately referred to as control system 50) includes the plurality of imaging devices 30a, 30b, 30c, and 30d and various control devices for controlling the excavator 1. These devices are provided in the vehicle body 1B of the excavator 1 illustrated in FIG. 1, that is, in the swing body 3 in the embodiment. In the embodiment, the control system 50 corresponds to a shape measuring system.

Various control devices included in the control system 50 include a detection processing device 51, a construction information generation device 52, a sensor control device 53, an engine control device 54, a pump control device 55, and a work device control device 56 illustrated in FIG. 3. Besides the above devices, the control system 50 includes a construction management device 57 that manages the state of the excavator 1 and the construction situation by the excavator 1. Further, the control system 50 includes a display device 58 that displays information of the excavator 1 and displays a guidance image for construction on a screen 58D, and a communication device 25 that communicates with at least one of a management device 61 of a management facility 60, another work machine 70, a mobile terminal device 64, and a device other than the management device 61 of the management facility 60 existing outside the excavator 1. Further, the control system 50 has a position detection device 23 for acquiring information necessary for controlling the excavator 1 and an IMU 24 as an example of a posture detection device. In the embodiment, the control system 50 may include at least the detection processing device 51 and the construction information generation device 52.

In the embodiment, the detection processing device 51, the construction information generation device 52, the sensor control device 53, the engine control device 54, the pump control device 55, the work device control device 56, the construction management device 57, the display device 58, the position detection device 23, and the communication device 25 are connected to a signal line 59 and communicates with one another. In the embodiment, the communication standard using the signal line 59 is, but not limited to, controller area network (CAN). Hereinafter, the term "excavator 1" may refer to various electronic devices such as the detection processing device 51 and the construction information generation device 52 included in the excavator 1.

Figure 4:
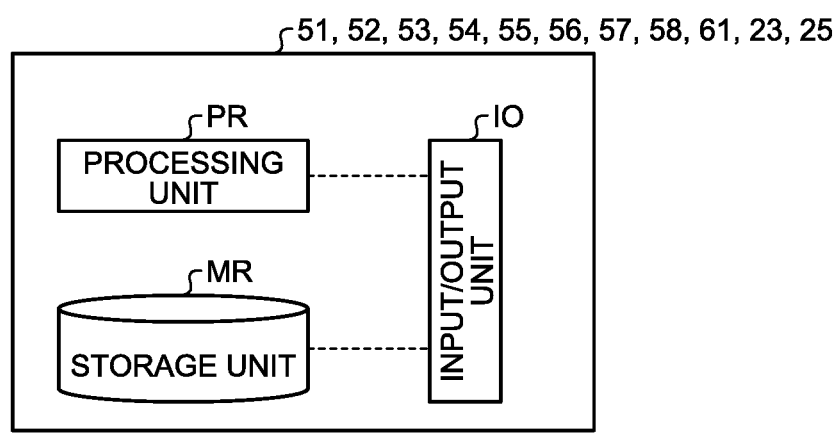
FIG. 4 is a diagram illustrating a hardware configuration example of various devices included in the excavator and a management device.

FIG. 4 is a diagram illustrating a hardware configuration example of the various devices included in the excavator 1 and the management device 61. In the embodiment, the detection processing device 51, the construction information generation device 52, the sensor control device 53, the engine control device 54, the pump control device 55, the work device control device 56, the construction management device 57, the display device 58, the position detection device 23, the communication device 25 included in the excavator 1, and the management device 61 include a processing unit PR, a storage unit MR, and an input/output unit IO, as illustrated in FIG. 4. The processing unit PR is realized by a processor such as a central processing unit (CPU) and a memory, for example.

As the storage unit MR, at least one of a nonvolatile or volatile semiconductor memory such as a random access memory (RAM), random access memory (ROM), a flash memory, an erasable programmable random access memory (EPROM), and an electrically erasable programmable random access memory (EEPROM), a magnetic disk, a flexible disk, and a magneto-optical disk is used.

The input/output unit IO is an interface circuit for the excavator 1 or the management device 61 to transmit and receive data, signals, and the like to and from other devices and internal devices. The internal device includes the signal line 59 in the excavator 1.

The excavator 1 and the management device 61 store, in the storage units MR, computer programs for causing the processing units PR to realize the respective functions. The processing unit PR of the excavator 1 and the processing unit PR of the management device 61 realize the functions of the respective devices by reading and executing the computer programs from the storage units MR. The various electronic apparatuses and devices included in the excavator 1 and the management device 61 may be realized by dedicated hardware, or a plurality of processing circuits may realize the functions in cooperation with one another. Next, the various electronic devices and devices included in the excavator 1 will be described.

The detection processing device 51 obtains a position of an object, to be specific, coordinates of the object in a three-dimensional coordinate system by applying image processing in a stereo method to a pair of object images imaged by at least a pair of the imaging devices 30. In this manner, the detection processing device 51 can three-dimensionally measure the object, using a pair of images obtained by imaging the same object with at least the pair of imaging devices 30. That is, at least the pair of imaging devices 30 and the detection processing device 51 three-dimensionally measure the object by the stereo method. The image processing in the stereo method is a technique for obtaining the distance to the object from two images obtained by observing the same object from two different imaging devices 30. For example, the distance to the object is expressed as a range image in which distance information to the object is visualized by shading.

The detection processing device 51 acquires object information detected by at least the pair of imaging devices 30 and obtains shape information indicating a three-dimensional shape of the object from the acquired object information. In the embodiment, at least the pair of imaging devices 30 images the object, thereby to generate and output the object information. The object information is an image of a construction object imaged by at least the pair of imaging devices 30. The detection processing device 51 obtains and outputs the shape information by applying the image processing by the stereo method to the object image. In the embodiment, the construction object of the excavator 1 including at least the pair of imaging devices 30 is imaged by at least the pair of imaging devices 30. However, a construction object of another work machine may be imaged by at least the pair of imaging devices 30.

In the embodiment, the object detected by the imaging device 30 is an object of construction (hereinafter referred to as construction object as appropriate) and an object after construction. In the embodiment, the construction object and the object after construction may just be a construction object and an object after construction for at least one of the excavator 1 including the imaging devices 30, another excavator lot, a work machine other than the excavators, and an operator.

The detection processing device 51 includes a calculation unit 51A and an information providing unit 51B. The calculation unit 51A applies image processing in the stereo method to the pair of images imaged by at least the pair of imaging devices 30 to obtain the shape information. The information providing unit 51B attaches various types of information to the shape information and outputs the shape information. The various types of information attached to the shape information include time information. The time information includes information of at least one time existing from the time when the object is detected by the calculation unit 51A and at least the pair of imaging devices 30 to the time when the shape information is output. The time information is obtained from, for example, a timer in the detection processing device 51. The various types of information may further include at least one of information indicating the position where at least the pair of imaging devices 30 has imaged the object, and information for identifying the excavator 1 including the imaging devices 30 that have imaged the object, in addition to the time information. Functions of the calculation unit 51A and the information providing unit 51B are realized by the processing unit PR illustrated in FIG. 4.

In the embodiment, at least the pair of imaging devices 30 corresponds to an object detection unit attached to the excavator 1 and which detects the object and outputs the object information. The detection processing device 51 corresponds to a shape detection unit that outputs shape information representing a three-dimensional shape of the object, using the object information detected by at least the pair of imaging devices 30. A 3D scanner such as a laser scanner may be used in place of at least the pair of imaging devices 30. Since the 3D scanner detects the object and outputs the shape information indicating the three-dimensional shape of the object, the 3D scanner has the functions of the object detection unit and the shape detection unit described above.

A hub 31 and an imaging switch 32 are connected to the detection processing device 51. The plurality of imaging devices 30a, 30b, 30c, and 30d is connected to the hub 31. The imaging devices 30a, 30b, 30c, and 30d and the detection processing device 51 may be connected without using the hub 31. The imaging results of the imaging devices 30a, 30b, 30c, and 30d are input to the detection processing device 51 via the hub 31. The detection processing device 51 acquires the imaging results of the imaging devices 30a, 30b, 30c, and 30d, that is, object images in the embodiment, via the hub 31. In the embodiment, when the imaging switch 32 is operated, at least the pair of imaging devices 30 images the object. The imaging switch 32 is installed in the driver's cab 4 illustrated in FIG. 2. For example, the imaging switch 32 is installed near the operation device 35. However, the installation location of the imaging switch 32 is not limited thereto.

In a case of acquiring the object images by at least the pair of imaging devices 30, the control system 50 may start imaging at the same time as start of swing of the swing body 3 and terminate the imaging at the time of stop of the swing, and apply the image processing in the stereo method on the basis of the images acquired during the swing to obtain the shape information. In this case, the detection processing device 51 receives a signal or an electrical signal indicating change of a pilot pressure, which is output with the operation of the operation device for causing the swing body 3 to swing, of the operation device 35, and the control system 50 determines timing of swing start and swing stop of the swing body 3.

The construction information generation device 52 obtains and outputs target construction information, which is shape information targeted when the excavator 1 constructs the construction object. In the embodiment, the construction information generation device 52 obtains the target construction information, using the shape information of the construction object obtained by the detection processing device 51. In the embodiment, the target construction information is position information that expresses the shape targeted when the construction object is constructed, by three-dimensional coordinates in the global coordinate system. The target construction information may be information of three-dimensional coordinates in a coordinate system other than the global coordinate system. In the embodiment, the construction information generation device 52 corresponds to a construction information generation unit.

The information of the construction object acquired by at least the pair of imaging devices 30 may be transmitted to an outside of the excavator 1 via the communication device 25, and the management device 61 may obtain object coordinates in the three-dimensional coordinate system, for example. In this case, the management device 61 realizes the function of the detection processing device 51. Further, the management device 61 may realize the function of the construction information generation device 52. The shape information of the construction object obtained by the detection processing device 51 mounted on the excavator 1 may be transmitted to the outside of the excavator 1 via the communication device 25, and the management device 61 may obtain the target construction information, for example. In this case, the management device 61 realizes the function of the construction information generation device 52.

The sensor control device 53 is connected with sensors for detecting information of a state of the excavator 1 and information of a state of surroundings of the excavator 1. The sensor control device 53 converts the information acquired from the sensors into a format that can be handled by other electronic devices and devices, and outputs the converted information. The information of a state of the excavator 1 is, for example, information of a posture of the excavator 1, information of a posture of the work device 2, or the like. In the example illustrated in FIG. 3, the IMU 24, a first angle detection unit 18A, a second angle detection unit 18B, and a third angle detection unit 18C are connected to the sensor control device 53 as the sensors that detect the information of a state of the excavator 1. However, the sensors are not limited to these detection units.

The IMU 24 detects and outputs acceleration and angular velocity acting on the IMU 24, that is, acceleration and angular velocity acting on the excavator 1. The posture of the excavator 1 can be obtained from the acceleration and the angular velocity acting on the excavator 1. Any device other than the IMU 24 may be employed as long as the device can detect the posture of the excavator 1. In the embodiment, the first angle detection unit 18A, the second angle detection unit 18B, and the third angle detection unit 18C are, for example, stroke sensors. The respective sensors detect stroke lengths of the boom cylinder 10, the arm cylinder 11, and the bucket cylinder 12, thereby to indirectly detect a rotation angle of the boom 6 with respect to the vehicle body 1B, a rotation angle of the arm 7 with respect to the boom 6, and a rotation angle of the bucket 8 with respect to the arm 7. The position of a portion of the work device 2 in the vehicle body coordinate system can be obtained from the rotation angle of the boom 6 with respect to the vehicle body 1B, the rotation angle of the arm 7 with respect to the boom 6, and the rotation angle of the bucket 8 with respect to the arm 7 detected by the first angle detection unit 18A, the second angle detection unit 18B, and the third angle detection unit 18C, and the dimensions of the work device 2. An example of the position of a portion of the work device 2 is the position of the cutting edge 8BT of the bucket 8. The first angle detection unit 18A, the second angle detection unit 18B, and the third angle detection unit 18C may be potentiometers or inclinometers in place of the stroke sensors.

The engine control device 54 controls an internal combustion engine 27 that is a power generation device of the excavator 1. The internal combustion engine 27 is, but not limited to, a diesel engine, for example. Further, the power generating device of the excavator 1 may be a hybrid device in combination of the internal combustion engine 27 and a generator motor. The internal combustion engine 27 drives a hydraulic pump 28.

The pump control device 55 controls a flow rate of a hydraulic fluid discharged from the hydraulic pump 28. In the embodiment, the pump control device 55 generates a control command signal for adjusting the flow rate of the hydraulic fluid discharged from the hydraulic pump 28. The pump control device 55 changes the flow rate of the hydraulic fluid discharged from the hydraulic pump 28 by changing a swash plate angle of the hydraulic pump 28, using the generated control signal. The hydraulic fluid discharged from the hydraulic pump 28 is supplied to a control valve 29. The control valve 29 supplies the hydraulic fluid supplied from the hydraulic pump 28 to the hydraulic devices such as the boom cylinder 10, the arm cylinder 11, the bucket cylinder 12, and a hydraulic motor 5M, and drives the hydraulic devices.

The work device control device 56 executes control to move the cutting edge 8BT of the bucket 8 along a target construction surface. The work device control device 56 corresponds to a work device control unit. Hereinafter, this control is appropriately referred to as work device control. In executing the work device control, the work device control device 56 obtains the target construction information generated by the construction information generation device 52, and controls the control valve 29 to control the work device 2 such that the cutting edge 8BT of the bucket 8 conforms to the target construction surface included in the target construction information, for example. The excavator 1 may not include the work device control device 56, and may be able to display a positional relationship between the target construction information obtained by a method described below and its own work device 2 on the screen 58D of the display device 58 as a guidance image for construction.

For example, the construction management device 57 collects at least one of the shape information obtained by the detection processing device 51, the target construction information generated by the construction information generation device 52, the shape information of the construction result of the construction object constructed by the excavator 1, and shape information indicating a current state landform of the construction object to be constructed by the excavator 1, and stores the collected information to a storage unit 57M. The construction management device 57 transmits the construction result stored in the storage unit 57M to the management device 61 or the mobile terminal device 64 via the communication device 25. The construction management device 57 transmits the construction result stored in the storage unit 57M to the management device 61 or the mobile terminal device 64 via the communication device 25. The construction management device 57 may collect at least one of the shape information obtained by the detection processing device 51 and the target construction information and transmit the collected information to the management device 61 or the mobile terminal device 64 without storing the information to the storage unit 57M. The storage unit 57M corresponds to the storage unit MR illustrated in FIG. 4.

The construction management device 57 may be provided in, for example, the management device 61 provided outside the excavator 1. In this case, the construction management device 57 acquires the shape information or the construction result from the excavator 1 via the communication device 25.

The construction result is, for example, shape information obtained by imaging the construction object after construction by at least the pair of imaging devices 30 and applying the image processing by the stereo method to the imaging result by the detection processing device 51. Hereinafter, the shape information indicating the current state landform of the construction object to be constructed is referred to as current state landform information as appropriate. Further, the shape information may be shape information indicating the construction result and may be shape information indicating the current state landform. The current state landform information is, for example, shape information obtained by the detection processing device 51 after the construction object to be constructed by the excavator 1, the another work machine 70, or the operator is imaged by at least the pair of imaging devices 30.

For example, the construction management device 57 collects the construction result after work of the day is completed and transmits the collected result to at least one of the management device 61 and the mobile terminal device 64, or collects the construction result a plurality of times, of the work of the day, and transmits the collected result to at least one of the management device 61 and the mobile terminal device 64. The construction management device 57 may transmit the shape information before construction to the management device 61 or the mobile terminal device 64 before work in the morning, for example.

In the embodiment, the construction management device 57 collects the construction result twice at noon and at the end of work, of the work of the day, and transmits the results to the management device 61 or the mobile terminal device 64. The construction result may be a construction result obtained by imaging a range where the construction has been performed, of the entire construction site, or may be a construction result obtained by imaging the entire construction site. If the construction result transmitted to the management device 61 or the mobile terminal device 64 is the range where the construction has been performed, an increase in the imaging time, the image processing time, and the transmission time of the construction result can be suppressed, which is favorable.

The display device 58 displays the information of the excavator 1 on the display screen 58D like a liquid crystal display panel and displays the guidance image for construction on the screen 58D. In addition, in the embodiment, the display device 58 obtains the position of the work device 2 when the above-described work device control is executed. The position of the cutting edge 8BT obtained by the display device 58 is the position of the cutting edge 8BT of the bucket 8 in the embodiment. The display device 58 acquires the current positions of the antennas 21 and 22 detected by the position detection device 23, the rotation angles detected by the first angle detection unit 18A, the second angle detection unit 18B, and the third angle detection unit 18C, the dimensions of the work device 2 stored in the storage unit MR, and output data of the IMU 24, and obtains the position of the cutting edge 8BT of the bucket 8, using the acquired information. In the embodiment, the display device 58 obtains the position of the cutting edge 8BT of the bucket 8. However, the position of the cutting edge 8BT of the bucket 8 may be obtained by a device other than the display device 58.

The communication device 25 is a communication unit in the embodiment. The communication device 25 communicates with at least one of the management device 61 of the management facility 60, the another work machine 70, and the mobile terminal device 64 via a communication line NTW, and exchanges information with each other. Among the information exchanged by the communication device 25, information to be transmitted from the control system 50 to at least one of the management device 61, the another work machine 70, and the mobile terminal device 64 is information regarding construction. The information regarding construction includes at least one of the above-described shape information and information obtained from the shape information. The information obtained from the shape information includes, but is not limited to, the above-described target construction information and information obtained by processing the shape information, for example. The information regarding construction may be transmitted by the communication device 25 after being stored in the storage unit of the detection processing device 51, the storage unit of the construction information generation device 52, and the storage unit 57M of the construction management device 57, or may be transmitted without being stored in the storage units.

In the embodiment, the communication device 25 performs communication by wireless communication. Therefore, the communication device 25 includes the wireless communication antenna 25A. The mobile terminal device 64 is, for example, possessed by an administrator who manages the work of the excavator 1. However, an embodiment is not limited thereto. The another work machine 70 has a function to communicate with at least one of the excavator 1 having the control system 50 and the management device 61. The another work machine 70 may be an excavator 1 having the control system 50, an excavator without the control system 50, or a work machine other than an excavator. The communication device 25 may communicate with at least one of the management device 61 of the management facility 60, the another work machine 70, and the mobile terminal device 64 via wired communication, and exchange information with each other.

The construction management system 100 includes the management device 61 of the management facility 60, the control system 50, and the excavator 1 having the control system 50. The construction management system 100 may further include the mobile terminal device 64. One or a plurality of the excavators 1 having the control system 50 included in the construction management system 100 may be used. The management facility 60 includes the management device 61 and a communication device 62. The management device 61 communicates with at least the excavator 1 via the communication device 62 and the communication line NTW. The management device 61 may communicate with the mobile terminal device 64 or the another work machine 70. Wireless communication devices may be mounted on the excavator 1, and at least one of another excavator lot and another work machine so as to enable direct wireless communication between vehicles. Then, at least one of the excavator 1, the another excavator lot, and the another work machine may be equipped with a device or an electronic device capable of executing processing executed by the management device 61 of the management facility 60, or the like.

The management device 61 receives at least one of the construction result and the current state landform information from the excavator 1 and manages a progress of construction. The management device 61 may receive the shape information from the excavator 1, generate the target construction information, using the shape information, and transmit the generated target construction information to the excavator 1. The management device 61 may generate the target construction information from design information of the construction object and transmit the target construction information to the excavator 1. The management device 61 may process the construction result received from the excavator 1 to make a moving image of the progress information of the construction and display the moving image on a display device 67, or transmit information of the moving image to the excavator 1 or the mobile terminal device 64 and display the moving image on the display device 58 of the excavator 1 or the screen of the mobile terminal device 64. As described above, the generation of the target construction information executed by the management device 61 may be executed by at least one of the excavator 1 and the another work machine 70.

<Construction of Construction Object>

In the embodiment, the control system 50 obtains the shape information that is information indicating the shape of the construction object, by causing at least two of the plurality of imaging devices 30 illustrated in FIG. 2 to image the construction object. Then, the control system 50 obtains the target construction information, using the obtained shape information. When the excavator 1 constructs the construction object, the control system 50 causes the work device 2 to conform to the obtained target construction information.

Figure 5:
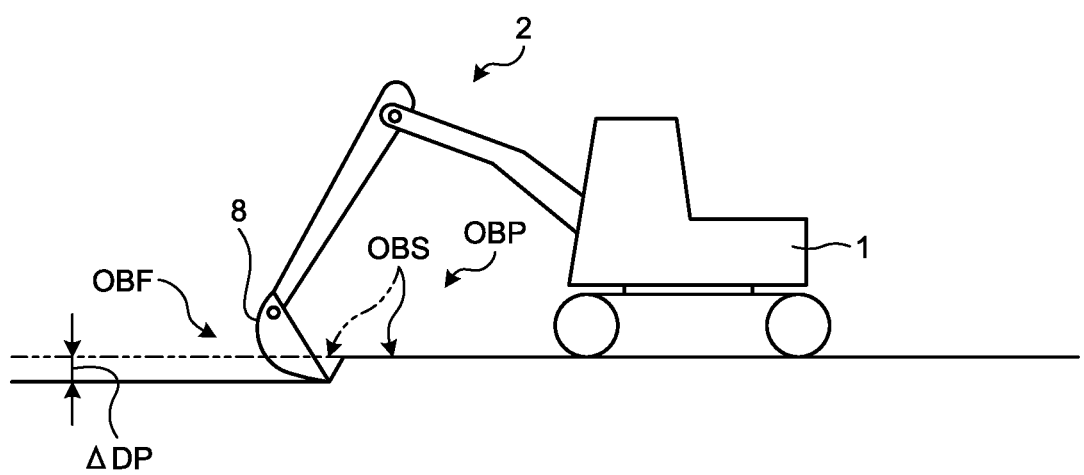
FIG. 5 is a diagram illustrating an example of a construction site constructed by the excavator according to the embodiment.

FIG. 5 is a diagram illustrating an example of a construction site constructed by the excavator 1 according to the embodiment. In the embodiment, a construction object OBP of the excavator 1 is the ground. In the embodiment, the construction object OBP is at least a part of area of the construction site. In the embodiment, as illustrated in FIG. 5, the construction applied to the construction object OBP by the excavator 1 is work to scrape topsoil by a predetermined depth ΔDP from a surface OBS of the construction object OBP. In the construction object OBP, a part where construction has been executed is a construction executed part OBF. The construction executed part OBF may refer to a part where the construction is not necessary, depending on a construction plan. The construction executed part OBF is at least a part of the construction object OBP. Next, the shape information obtained by the control system 50 will be described.

<Imaging of Object and Generation of Shape Information>

Figure 6:
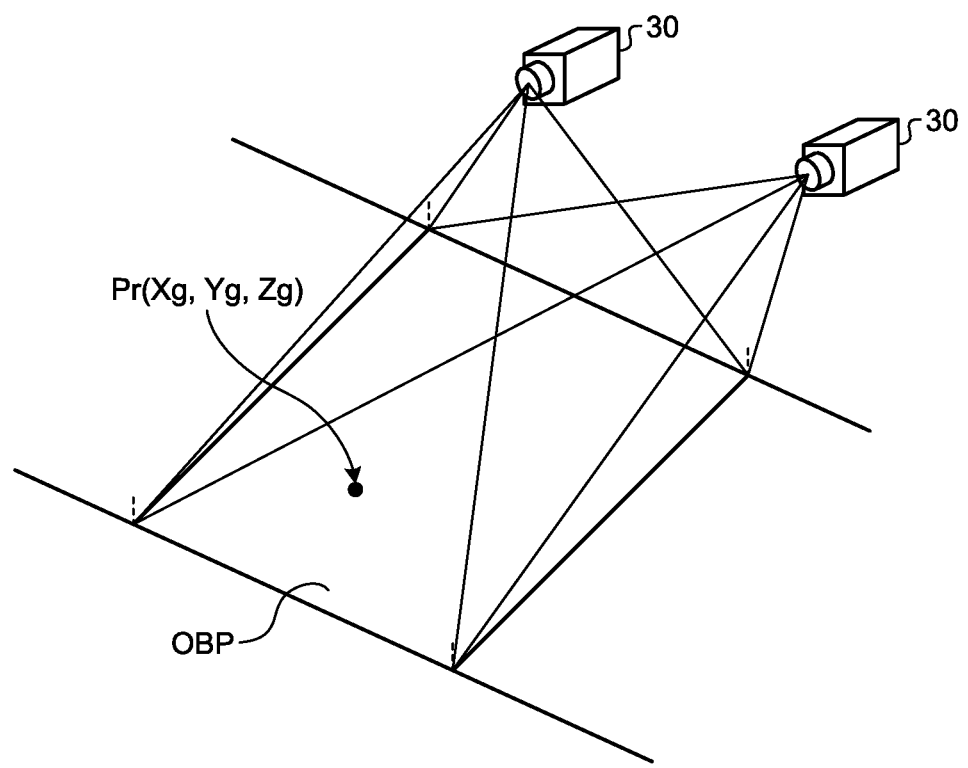
FIG. 6 is a diagram for describing shape information obtained by the control system of the work machine according to the embodiment.

FIG. 6 is a diagram for describing the shape information obtained by the control system of the work machine according to the embodiment. In this case, regarding the shape information, the construction object OBP that is a part to be constructed by the excavator 1 is in front of the excavator 1. The shape information is obtained from the construction object OBP. In a case of generating the shape information from the construction object OBP, the control system 50 causes at least the pair of imaging devices 30 to image the construction object OBP. In the embodiment, when the operator of the excavator 1 operates the imaging switch 32 illustrated in FIG. 3 to input an imaging command to the detection processing device 51, the detection processing device 51 causes at least the pair of imaging devices 30 to image the construction object OBP.

The detection processing device 51 of the control system 50 applies the image processing by the stereo method to the image of the construction object OBP imaged by at least the pair of imaging devices 30 to obtain position information, in the embodiment, three dimensional position information of the construction object OBP. The position information of the construction object OBP obtained by the detection processing device 51 is information in the coordinate system of the imaging device 30 and is thus converted into position information in the global coordinate system. The position information of the construction object in the global coordinate system is the shape information. In the embodiment, the shape information is information including at least one position Pr (Xg, Yg, Zg) of the surface OBS of the construction object OBP in the global coordinate system. The position Pr (Xg, Yg, Zg) is coordinates in the global coordinate system and is the three-dimensional position information.

Figure 7:
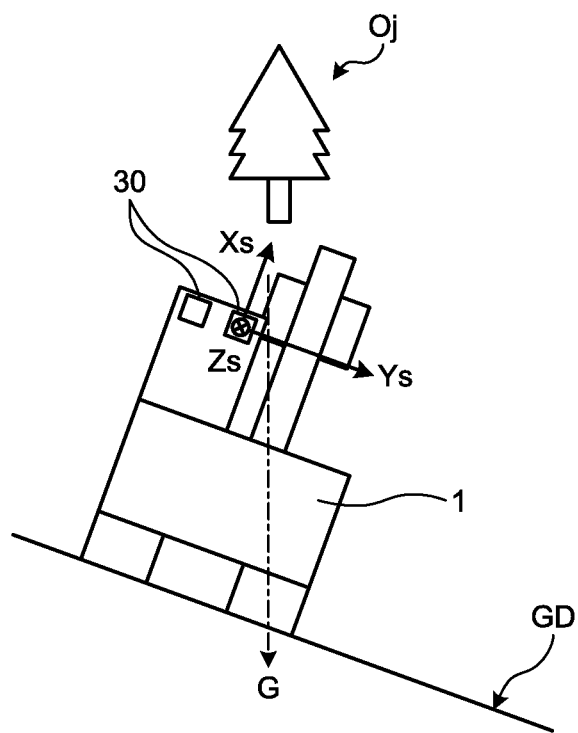
FIG. 7 is a diagram illustrating a state in which the excavator is inclined with respect to an acting direction of gravity.
Figure 8:
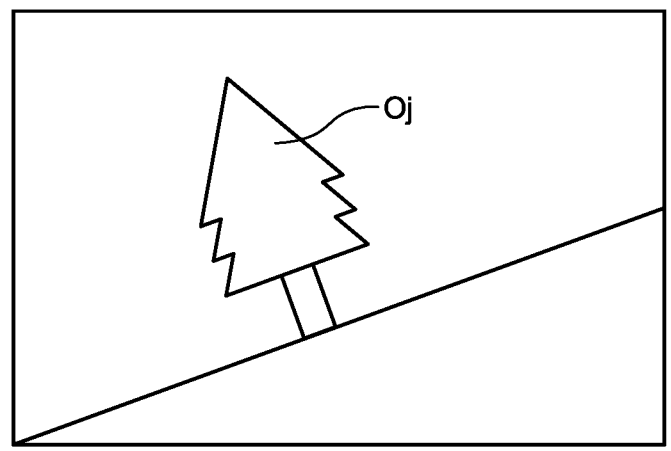
FIG. 8 is a diagram illustrating an example of an image imaged in a state where the excavator is inclined with respect to the acting direction of gravity.

FIG. 7 is a diagram illustrating a state in which the excavator 1 is inclined with respect to an acting direction G of gravity. FIG. 8 is a diagram illustrating an example of an image of an object Oj imaged by at least the pair of imaging devices 30 in a state where the excavator 1 is inclined with respect to the acting direction G of gravity. When at least the pair of imaging devices 30 images the object Oj in a state where the excavator 1 is installed on an inclined surface GD, an imaging device coordinate system (xs, ys, zs) is inclined with respect to the acting direction G of gravity. If the image processing by the stereo method is applied to the image obtained in this state and the shape information is obtained, the shape information may be affected by the inclination because the object Oj is inclined as illustrated in FIG. 8. The control system 50 detects the posture of the excavator 1 by the IMU 24 and obtains the shape information, using information regarding the detected posture of the excavator 1.

Figure 9:
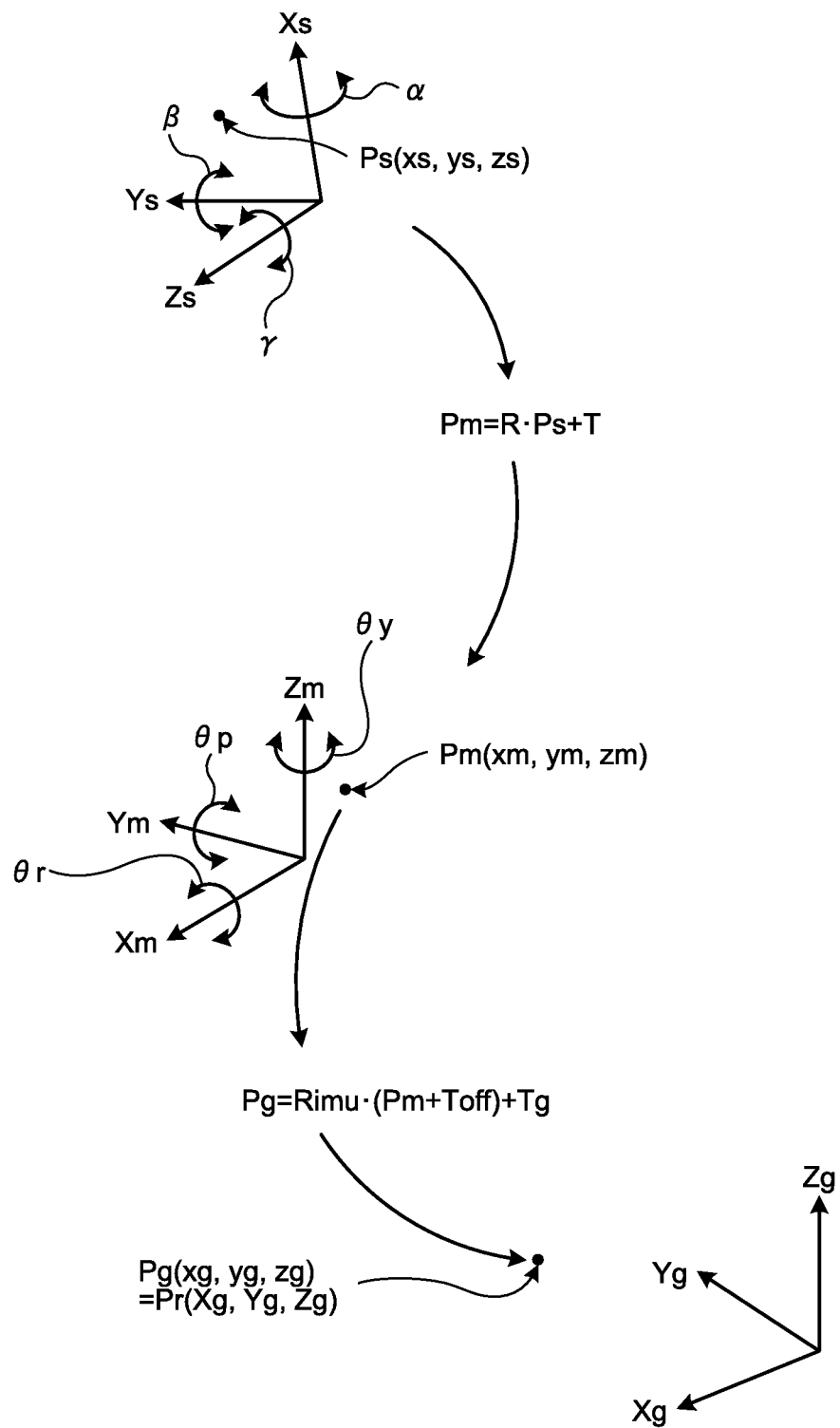
FIG. 9 is a diagram for describing a processing example for obtaining shape information by the control system according to the embodiment.
Figure 10:
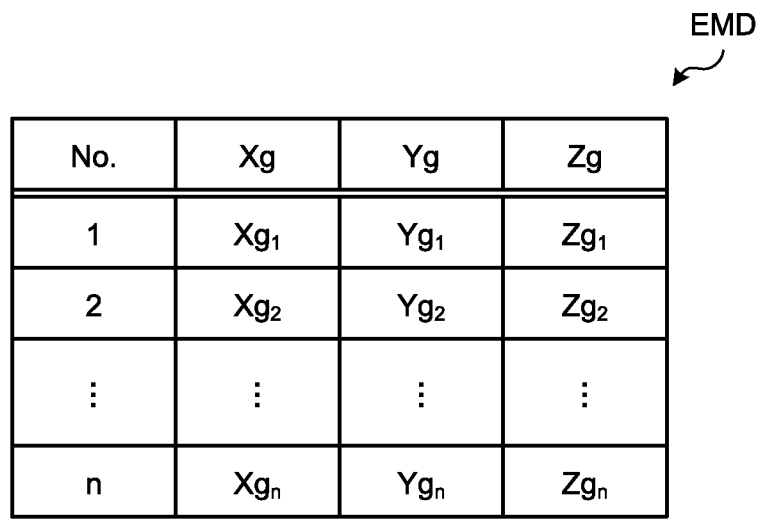
FIG. 10 is a diagram illustrating an example of a data file of the shape information obtained by the control system according to the embodiment.

FIG. 9 is a diagram for describing a processing example for obtaining the shape information by the control system 50 according to the embodiment. FIG. 10 is a diagram illustrating an example of a data file of the shape information obtained by the control system 50 according to the embodiment. A position Ps (xs, ys, zs) of the construction object OBP obtained from the images imaged by at least the pair of imaging devices 30 is the coordinates of the imaging device coordinate system (xs, ys, zs). Since the shape information is the coordinates in the global coordinate system (Xg, Yg, Zg), the detection processing device 51 converts the position Ps (xs, ys, zs) into a position Pg (xs, ys, zs) of the global coordinate system (Xg, Yg, Zg). The position Pg (xs, ys, zs) is a position Pr (Xg, Yg, Zg) of the surface OBS of the object OBP, that is, the shape information.

The position Ps (xs, ys, zs) is converted from the imaging device coordinate system (xs, ys, zs) into a position Pm (xm, ym, zm) of the vehicle body coordinate system (Xm, Ym, Zm) by Expression (1). The position Pm (xm, ym, zm) of the vehicle body coordinate system (Xm, Ym, Zm) is converted into the position Pg (xs, ys, zs) of the global coordinate system (Xg, Yg, Zg) by Expression (2).

$$Pm = R \cdot Ps + T \tag{1}$$

$$Pg = Rimu \cdot (Pm + Toff) + Tg \tag{2}$$

$$R = \begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix} \tag{3}$$

$$T = \begin{pmatrix} x_0 \\ y_0 \\ z_0 \end{pmatrix} \tag{4}$$

$$Rimu = \tag{5}$$
$$\begin{pmatrix} \cos\theta d & -\sin\theta d & 0 \\ \sin\theta d & \cos\theta d & 0 \\ 0 & 0 & 1 \end{pmatrix} \begin{pmatrix} \cos\theta p & 0 & \sin\theta p \\ 0 & 1 & 0 \\ -\sin\theta p & 0 & \cos\theta p \end{pmatrix} \begin{pmatrix} 1 & 0 & 0 \\ 0 & \cos\theta r & -\sin\theta r \\ 0 & \sin\theta r & \cos\theta r \end{pmatrix}$$

$$Toff = \begin{pmatrix} x_1 \\ y_1 \\ z_1 \end{pmatrix} \tag{6}$$

$$Tg = \begin{pmatrix} x_2 \\ y_2 \\ z_2 \end{pmatrix} \tag{7}$$

R in Expression (1) is a rotation matrix expressed by Expression (3), and T is a translation vector expressed by the matrix of Expression (4). Rimu in Expression (2) is a rotation matrix expressed by Expression (5), and Toff is a translation vector expressed by the matrix of Expression (6). Toff represents an offset value of the distance from the origin of the vehicle body coordinate system to one of the antennas 21 and 22. Tg is a translation vector of one of the antennas 21 and 22, which is expressed by the matrix of Expression (7). An angle α, an angle β, and an angle γ in the rotation matrix R represent inclination of the imaging device coordinate system with respect to the vehicle body coordinate system. The angle α, the angle β, and the angle γ are obtained in advance after the plurality of imaging devices 30 is attached to the excavator 1, and are stored in the storage unit of the detection processing device 51, for example. $x_0$, $y_0$, and $z_0$ of the matrix T represent the distance between the origin of the imaging device coordinate system and the origin of the vehicle body coordinate system. $x_0$, $y_0$, and $z_0$ are measured, for example, after the plurality of imaging devices 30 is attached to the excavator 1 or are previously obtained from design information of the excavator 1, and are stored in the storage unit of the detection processing device 51.

An angle θr, an angle θp, and an angle θd in the rotation matrix Rimu are a roll angle, a pitch angle, and an azimuth angle of the excavator 1. The roll angle θr, the pitch angle θp, and the azimuth angle θd represent the posture of the excavator 1. The roll angle θr and the pitch angle θp are obtained by the IMU 24 illustrated in FIG. 3 or by the detection processing device 51 from the detection value of the IMU 24. The azimuth angle θd is obtained by a GPS compass configured from the antennas 21 and 22 and the position detection device 23 illustrated in FIG. 3. More specifically, the azimuth angle θd is obtained by the position detection device 23 on the basis of relative positions of the two antennas 21 and 22. The roll angle θr, the pitch angle θp, and the azimuth angle θd are changed as the posture of the excavator 1 is changed. In the embodiment, a yaw angle θy obtained by the IMU 24 may be used in place of the azimuth angle (azimuth data) obtained by the GPS compass. In the embodiment, the roll angle θr, the pitch angle θp, and the azimuth angle θd are detected by the IMU 24 or the position detection device 23 when at least the pair of imaging devices 30 detects the object, for example, the construction object in the construction site and the construction site after construction. The roll angle θr, the pitch angle θp, and the yaw angle θy or the azimuth angle θd may be obtained by a device other than the IMU 24 or the position detection device 23, for example, by a gyroscope.

$x_1$, $y_1$, and $z_1$ of the matrix Toff represent the distance from the origin of the vehicle body coordinate system to the installation positions of the antennas 21 and 22 illustrated in FIGS. 1 and 3. $x_1$, $y_1$, and $z_1$ are measured, for example, after the antennas 21 and 22 are attached to the excavator 1 or are obtained in advance from the design information of the excavator 1, and are stored in the storage unit of the detection processing device 51.

$x_2$, $y_2$, and $z_2$ of the matrix Tg represent the antennas 21 and 22 and the position of the antennas 21 and 22 in the global coordinate system detected by the position detection device 23 illustrated in FIGS. 1 and 3. $x_1$, $y_1$, and $z_1$ are changed as the position of the excavator 1, more specifically, the position of the antennas 21 and 22 is changed.

The detection processing device 51 converts the position Ps (xs, ys, zs) of the construction object OBP obtained from the images imaged by at least the pair of imaging devices 30 into a position Pg (xg, yg, zg) in the global coordinate system by Expressions (1) to (7). At this time, the detection processing device 51 acquires the roll angle θr and the pitch angle θp from the IMU 24 and acquires the position of the antennas 21 and 22 in the global coordinate system and the azimuth angle θd from the position detection device 23, and uses the obtained angles and position in the conversion. As described above, the detection processing device 51 may use the yaw angle θy detected by the IMU 24 instead of the azimuth angle θd. The detection processing device 51 employs the position Pg (xg, yg, zg) after conversion as the position Pr (Xg, Yg, Zg) of the surface OBS of the construction object OBP, that is, the shape information. In the embodiment, the position Pr of the surface OBS of the construction object OBP is illustrated as an example of the shape information. However, the shape information is not limited thereto. For example, the shape information may be the position of the surface of the construction object OBP after construction and the position of the surface of the construction object OBP in the process of construction.

The detection processing device 51 obtains and outputs the position Pr (Xg, Yg, Zg) of the surface OBS of the construction object OBP over the entire area of the construction object OBP imaged by at least the pair of imaging devices 30. In the embodiment, the detection processing device 51 generates a data file EMD of the obtained position Pr (Xg, Yg, Zg) for each predetermined unit as illustrated in FIG. 10. The data file EMD illustrated in FIG. 10 is a set of n positions Pr (Xg, Yg, Zg) (n is an integer of 1 or more). The data file EMD also corresponds to the shape information in the embodiment.

Examples of the predetermined unit include a range of the construction object OBP obtained by one imaging and a predetermined range of the construction object OBP. The predetermined range of the construction object OBP may be a part of the range obtained by one imaging or a range exceeding the range obtained by one imaging. In the latter case, a range obtained by a plurality of times of imaging becomes the predetermined range.

In the embodiment, when the detection processing device 51 generates the data file EMD, the detection processing device 51 stores the data file EMD in its own storage unit. Then, the detection processing device 51 generates the target construction information, using the position Pr of the data file EMD. In addition, the construction management device 57 may transmit the data file EMD generated by the detection processing device 51 from the communication device 25 to at least one of the management device 61, the mobile terminal device 64, and the another work machine 70 illustrated in FIG. 3.

Figure 11:
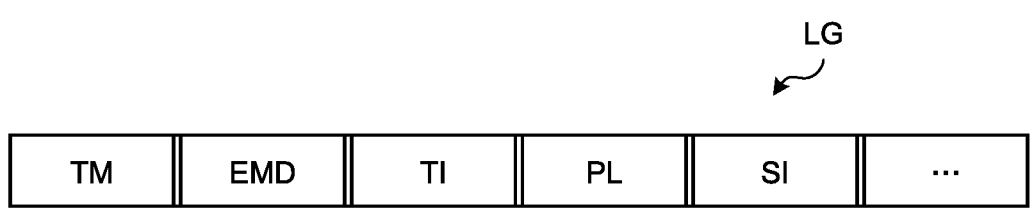
FIG. 11 is a diagram illustrating an example of information including data file transmitted by a construction management device.

FIG. 11 is a diagram illustrating an example of information including the data file EMD transmitted by the construction management device 57. In the present embodiment, the information providing unit 51B of the detection processing device 51 illustrated in FIG. 3 attaches time information TM for specifying the shape information to the shape information and outputs the shape information. The time information TM is information that specifies the shape information on the basis of time. In the present embodiment, as illustrated in FIG. 11, the information providing unit 51B generates and outputs work information LG including the time information TM and the data file EMD as the shape information. The time information TM may be, for example, a time when at least the pair of imaging devices 30 has imaged the construction object OBP, a time when the calculation unit 51A has generated the shape information, a time when the information providing unit 51B outputs the work information LG, or a time when an external device of the excavator 1, such as the management device 61 or the mobile terminal device 64 has acquired the shape information. That is, the time information TM is information of at least one time existing from a time when the construction object OBP before, during, or after construction has been detected by at least the pair of imaging devices 30 and the detection processing device 51 to a time when the external device of the excavator 1 has acquired the shape information. In a case where the time information TM is information of the time when the external device of the excavator 1 has acquired the shape information, the information providing unit 51B is provided in the external device of the excavator 1, and the information providing unit 51B provides the time information TM indicating the time when the external device has acquired the shape information to the shape information.

In the embodiment, the work information LG includes target construction information TI, an imaging position PL, and posture information SI of the excavator 1 in addition to the time information TM and the data file EMD. The target construction information TI is generated from the shape information included in the work information LG, that is, information of the data file EMD. The imaging position PL is information indicating a place where at least the pair of imaging devices 30 has imaged the construction object OBP before, during, or after construction. The imaging position PL is obtained on the basis of the position of the antennas 21 and 22 in the global coordinates detected by the position detection device 23 illustrated in FIG. 3. The posture information SI is information indicating the posture of the excavator 1, and is the roll angle θr, the pitch angle θp, and the yaw angle θy in the embodiment. The roll angle θr, the yaw angle θy, and the yaw angle θy are the detection values of the IMU 24. However, the azimuth angle θd detected by the position detection device 23 may be used in place of the yaw angle θy. In addition, the work information LG may include an identification number. The identification number is information indicating the positions of at least the pair of imaging devices 30 and information for identifying the excavator 1 including the imaging devices 30 that have imaged the object. The identification number may be, for example, an IP address of the communication device 25. Further, as the identification numbers, a production serial number of at least the pair of imaging devices, and a body number of the excavator 1 are used. However, an embodiment is not limited thereto.

The information included in the work information LG is not limited to the information described above. For example, the work information LG may include an operator ID for identifying the operator of the excavator 1. All the information of the work information LG may not be generated by the information providing unit 51B of the detection processing device 51. In the embodiment, the information providing unit 51B may generate and output the work information LG including at least the time information TM and the data file EMD. Information other than the time information TM and the data file EMD is provided by the construction management device 57, for example. In this case, the construction management device 57 acquires the target construction information TI generated by the construction information generation device 52, and adds the target construction information TI to the work information LG acquired from the information providing unit 51B. Further, the construction management device 57 acquires the identification number and the imaging position PL via the signal line 59 and adds the acquired information to the work information LG. The construction management device 57 transmits the work information LG twice a day at a predetermined timing, in the embodiment, to at least one of the management device 61 and the mobile terminal device 64.

In the embodiment, when at least. the pair of imaging devices 30 has imaged the object, the detection processing device 51 generates and outputs the work information LG including at least the time information TM and the data file EMD, and transmits the work information LG to an outside of the excavator 1 via the communication device 25. The work information LG transmitted to the outside of the excavator 1 is acquired by the management device 61 or the mobile terminal device 64.

In the embodiment, when the imaging switch 32 illustrated in FIG. 3 is operated, at least the pair of imaging devices 30 images the object The calculation unit 51A of the detection processing device 51 applies the image processing by the stereo method to the images imaged by the imaging devices 30 to generate the shape information. The information providing unit 51B of the detection processing device 51 outputs the work information LG in which the time information is attached to the shape information. The work information LG is transmitted to at least one of the management device 61 and the mobile terminal device 64 via the construction management device 57 and the communication device 25 or via the communication device 25.

To monitor the surroundings of the excavator 1, the detection processing device 51 causes at least the pair of imaging devices 30 to image the object at every predetermined time, for example, in every 10 minutes. Two-dimensional images imaged by at least the pair of imaging devices 30 are stored in the storage unit of the detection processing device 51, and when a certain amount of information is accumulated, the information is transmitted to the management device 61 via the communication device 25. The above-described two-dimensional images may be transmitted at timing when the work information LG is transmitted to the management device 61 or may be promptly transmitted to the management device 61 when imaged.

In the embodiment, the detection processing device 51 permits three-dimensional measurement using the imaging devices 30 on condition that the detection processing device 51 recognizes that the plurality of imaging devices 30 has been activated, that the signal line 59 is not disconnected, that the output of the IMU 24 is stable, and that the positioning by GNSS is FIX (normal). If any of the permission conditions is not established, the detection processing device 51 does not permit the three-dimensional measurement using the imaging devices 30 even if the imaging switch 32 is operated. The output of the IMU 24 being stable means the excavator 1 being in a stationary state. By providing the above-described conditions for the three-dimensional measurement by the imaging devices 30, a decrease in measurement accuracy of the object is suppressed. The permission conditions are examples for the control system 50 to permit the three-dimensional measurement. The control system 50 may use any one of the permission conditions or may not use the permission conditions.

Figure 12:
FIG. 12 is a diagram illustrating an example in which the data file is stored in a storage unit of the management device.

FIG. 12 is a diagram illustrating an example in which the data file EMD is stored in a storage unit of the management device 61. The work information LG transmitted from the excavator 1 is stored in the storage unit of the management device 61. When the work information LG is transmitted to the mobile terminal device 64, the work information LG may be stored in the storage unit of the mobile terminal device 64.

In the storage unit of the management device 61, the time information TM and the data file EMD are stored in association with each other as illustrated in a data table TB of FIG. 12. The data table TB is updated every time the management device 61 acquires new time information TM and a new data file EMD. Information having the same number assigned to the data file EMD indicates shape information of the same place on the work site. The management device 61 can generate information indicating a current situation of the construction site (hereinafter appropriately referred to as current state information) using the data file EMD included in the data table TB. In this case, if the numbers attached to the data files EMD are the same, current state information is generated using the latest data file EMD. Whether a data file is the latest data file EMD is determined by the time information TM associated with the data file EMD. For example, when two data files EMD1 exist, the management device 61 compares the time information TM corresponding to each data file EMD1 and generates current state information, using a newer data file EMD1. In doing so, the management device 61 can generate the latest current state information.

The management device 61 outputs information of the current landform of the entire construction site of the excavator 1, that is, the current state information, using the shape information to which the time information TM is added, that is, the data file EMD. For example, the management device 61 generates and outputs the current state information of the entire construction site of the excavator 1 by collecting and combining the data files EMD to which the latest time information TM is added over the construction site. The current state information of the entire construction site is displayed on the display device 67 of the management facility 60 or displayed on the mobile terminal device 64, for example.

The current state information of the entire construction site may be generated using the construction result by the excavator 1 or may be generated using the construction result by the another work machine 70. In addition, the current state information of the entire construction site may be generated using a construction result not depending on the excavator 1 and the another work machine 70, for example, a result of work done by the operator with a scoop or the like. In the present embodiment, the current state information of the entire construction site may just be generated using at least one of the construction result by the excavator 1, the construction result by the another work machine 70, and the construction result not depending on the excavator 1 and the another work machine 70. At least one of the construction management device 57 of the excavator and the mobile terminal device 64 may generate and output the current state information of the entire construction site.

Figure 13:
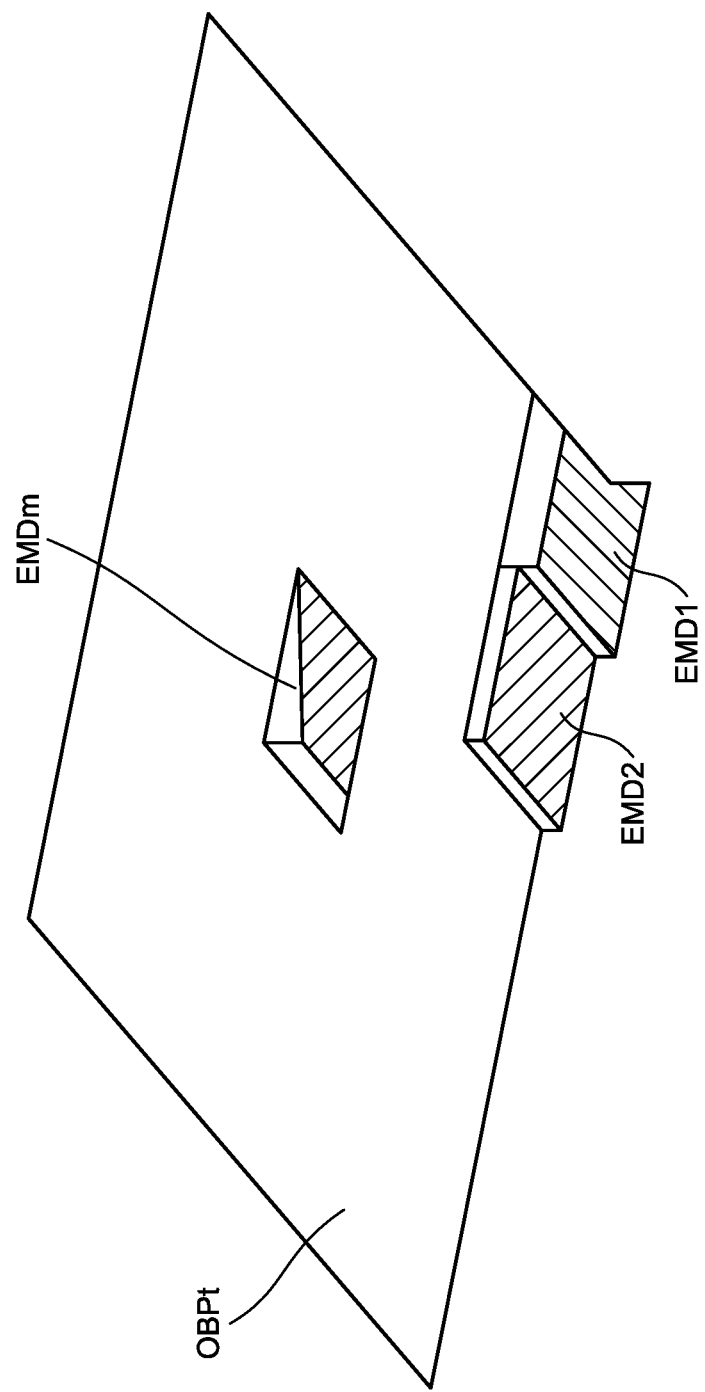
FIG. 13 is a diagram illustrating a relationship between a construction object of an entire construction site and a range corresponding to the data file EMD.

FIG. 13 is a diagram illustrating a relationship between an object to be constructed OBPt of the entire construction site and a range corresponding to the data file EMD. FIG. 13 illustrates an example in which ranges corresponding to the latest data files EMD1, EMD2, . . . and EMDm are displayed in the construction object OBPt of the entire construction site. The ranges corresponding to the data files EMD1, EMD2, and EMDm are ranges specified by the three-dimensional position information included in the data files EMD1, EMD2, . . . and EMDm.

For example, the management device 61 generates information superimposing the ranges corresponding to the data files EMD1, EMD2, and EMDm on the construction object OBPt of the entire construction site. Then, the management device 61 displays the generated information on the display device 67 in the management facility 60, for example. In doing so, the latest data files EMD1, EMD2, . . . and EMDm are displayed in the construction object OBPt, and thus the current situation of the construction site is indicated. The management device 61 can acquire the current situation of the construction site by combining the data files EMD in which pieces of the time information TM are the same or can be regarded as the same. The time information TM being regarded as the same means that the data files EMD corresponding to the time information TM within a predetermined time range being treated as obtained at the same time. For example, in a case where a range of 9 o'clock in the morning to 17 o'clock in the evening is the predetermined time range, the data files EMD having the time information TM within this time range of a certain day is treated as obtained at the same time, and the data files EMD are treated as obtained at a different time when day is changed.

Figure 14:
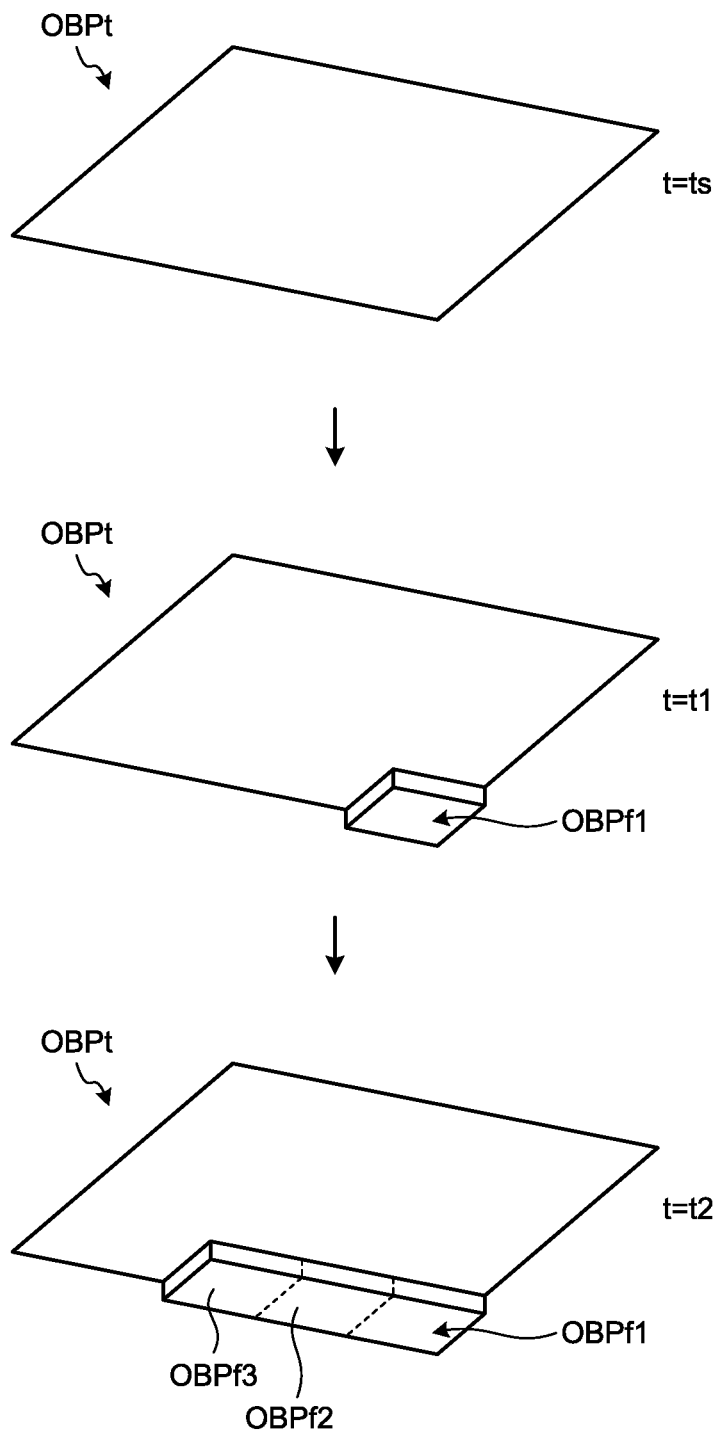
FIG. 14 is a diagram in which changes of the construction object of the entire construction site are chronologically arranged.

FIG. 14 illustrates changes of the construction object OBPt of the entire construction site which are chronologically arranged. Time t=ts indicates a state before construction at the construction site is started. At time t=t1, an area OBPf1 of the construction object OBPt is constructed. Since the area OBPf1 is specified by shape information at the time t=t1, that is, the three-dimensional information included in the data file EMD, the state of the entire construction site at the time t=t1 can be obtained by superimposing the area OBPf1 on the construction object OBPt before construction.

At time t=t2, an area OBPf2 and an area OBPf3 of the construction object OBPt are further constructed in addition to the area OBPf1. Since the area OBPf2 and the area OBPf3 are specified by the shape information at the time t=t2, that is, the three-dimensional information included in the data file EMD, the state of the entire construction site at the time t=t2 can be obtained by superimposing the area OBPf2 and the area OBPf3 on the construction object OBP before construction. Since the area OBPf1 has already been constructed at the time t=t2, obtainment of the shape information corresponding to the area OBPf1, that is, the data file EMD corresponding to the area OBPf1 is not necessary at the time t=t2. In a case where the data file EMD corresponding to the area OBPf1 has not been obtained, the information at the time t=t1 is the latest for the area OBPf1.

At the time t=t2, the area OBPf1 at the time t=t1 is superimposed together with the area OBPf2 and the area OBPf3 on the construction object OBPt before construction. In a case where the shape information corresponding to the area OBPf1, that is, the data file EMD corresponding to the area OBPf1 has been obtained at the time t=t2, the area OBPf1 based on the latest data file EMD is superimposed together with the area OBPf2 and the area OBPf3 on the construction object OBPt before construction.

The management device 61 generates the current state information of the entire construction object OBPt in order of the time t=ts, t1, and t2, and causes the display device 67 in the management facility 60 to display the generated current state information as three-dimensional images. In this case, the management device 61 can display the current state information by frame advance in every time. In doing so, an administrator can easily understand the progress of daily construction. The mobile terminal device 64 may access the management device 61 via the communication line NTW to acquire the current state information, and display the current state information on the screen. In doing so, the operator at the construction site, who is not in the management facility 60, can easily understand the progress of daily construction.

Figure 15:
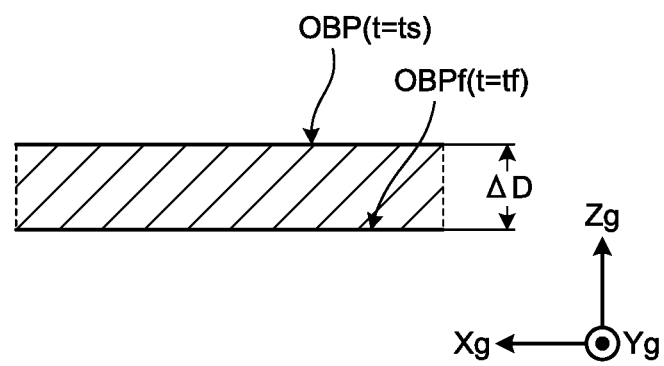
FIG. 15 is a diagram illustrating an example of obtaining an amount of removed soil or an amount of embankment from a difference in shape information obtained at different times.
Figure 16:
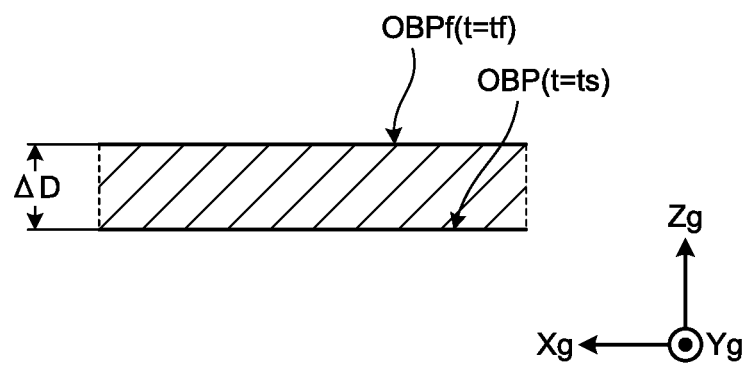
FIG. 16 is a diagram illustrating an example of obtaining an amount of removed soil or an amount of embankment from a difference in shape information obtained at different times.

FIGS. 15 and 16 are diagrams illustrating an example of obtaining an amount of removed soil or an amount of embankment from a difference in the shape information obtained at different times. In the embodiment, the amount of removed soil or the amount of embankment is obtained on the basis of the shape information obtained at different times. Assume that the construction object OBP at time t=ts before construction is constructed and an object OBPf after construction is obtained. In the global coordinate system (Xg, Yg, Zg), the difference between the Zg coordinate of the shape information obtained at time t=tf after construction and the Zg coordinate of the shape information obtained at time t=ts before construction is ΔD. When the difference ΔD is negative, the construction is soil removal. When the difference ΔD is positive, the construction is embankment. By multiplying the difference ΔD by a dimension in an Xg direction and a dimension in a Yg axis direction of the constructed range, the amount of removed soil or the amount of embankment of the construction object OBP is obtained (in the embodiment, the amount of soil is obtained by volume). In the present embodiment, the amount of removed soil or the amount of embankment by not only the excavator 1 but also the another work machine 70 may be obtained on the basis of the shape information obtained at different times.

By associating the data file EMD as the shape information with the time information TM in this manner, various types of information regarding construction of the construction site can be obtained. The processing of generating the current state information using the data file EMD and the time information TM and obtaining the amount of embankment or the amount of removed soil may be performed by any of the management device 61, the mobile terminal device 64, and the construction management device 57 of the excavator 1. Any of the management device 61, the mobile terminal device 64, and the construction management device 57 of the excavator 1 executes the above-mentioned processing and may transmit a result to another device via the communication line NTW. The result of the processing may be delivered to another device not only in communication but also in a storage device storing the result. Next, the target construction information will be described.

<Target Construction Information>

Figure 17:
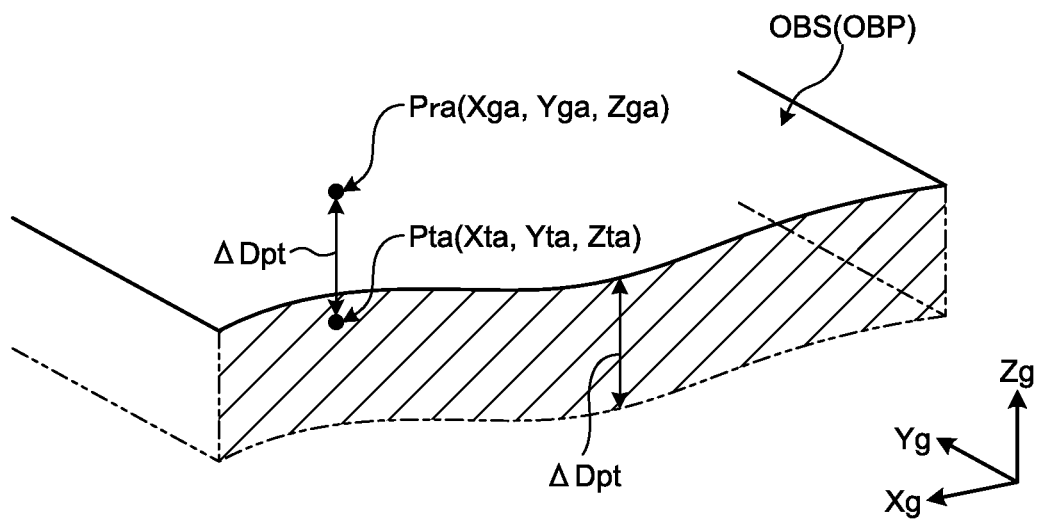
FIG. 17 is a diagram for describing target construction information generated by the control system of the work machine according to the embodiment.
Figure 18:
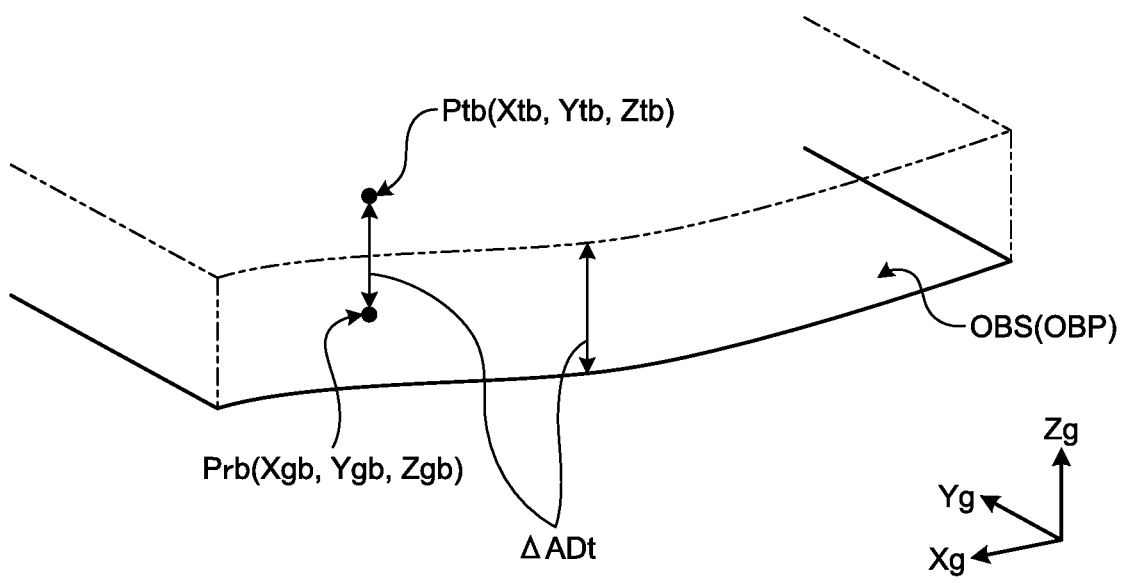
FIG. 18 is a diagram for describing target construction information generated by the control system of the work machine according to the embodiment.
Figure 19:
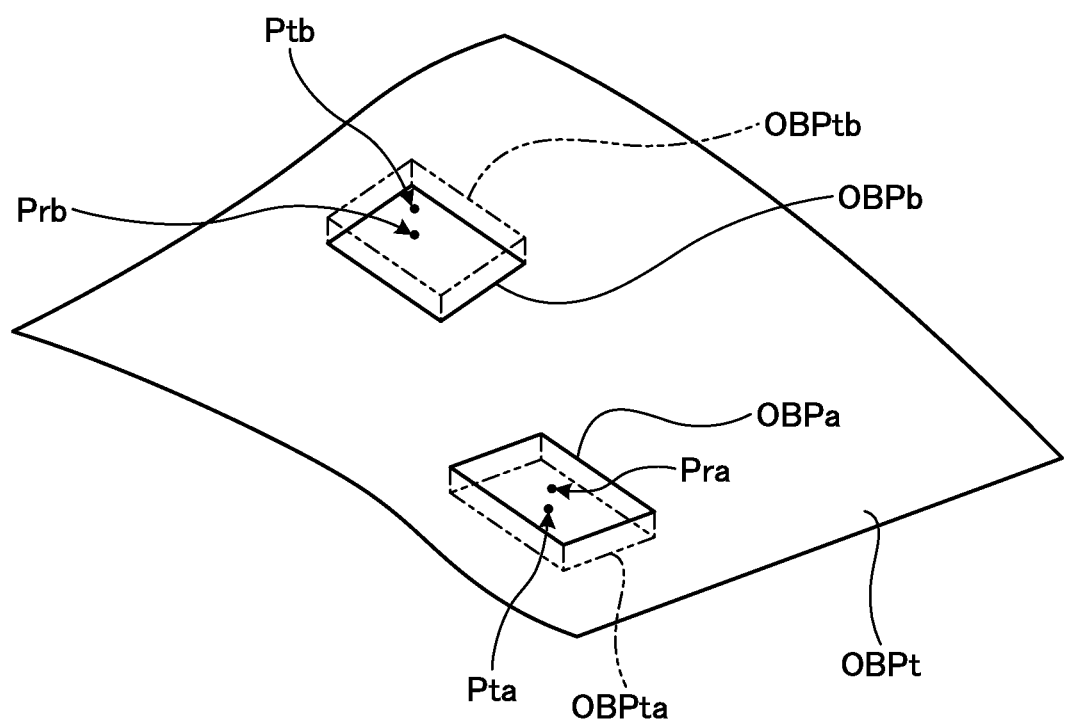
FIG. 19 is a diagram for describing target construction information generated by the control system of the work machine according to the embodiment.

FIGS. 17, 18, and 19 are diagrams for describing target construction information generated by the control system 50 of the work machine according to the embodiment. In the embodiment, the construction information generation device 52 illustrated in FIG. 3 obtains position information of a shape targeted when the target construction information, that is, the construction object OBP is constructed, using the shape information generated by the detection processing device 51. In the embodiment, as illustrated in FIGS. 11 and 12, the construction information generation device 52 changes the position of the surface OBS by processing the information indicating the position of the surface OBS of the construction object OBP included in the shape information, thereby to obtain the target construction information.

The example in FIG. 17 illustrates a construction example of removing a range of a distance ΔDPt from the surface OBS of the construction object OBP. In this case, the construction information generation device 52 obtains a position Pta (Xta, Yta, Zta) obtained by lowering a position Pra (Xga, Yga, Zga) of the surface OBS of the construction object OBP by the distance ΔDPt. In the embodiment, the construction information generation device 52 moves the position Pra (Xga, Yga, Zga) to a lower position by the distance ΔDPt by subtracting ΔDPt from Zga of the position Pra (Xga, Yga, Zga). Therefore, the position Pta (Xta, Yta, Zta) becomes a position Pta (Xga, Yga, Zga−ΔDPt). The position Pta (Xta, Yta, Zta) obtained in this manner becomes the target construction information. The construction information generation device 52 acquires the shape information, in the embodiment, the data file EMD from the detection processing device 51 illustrated in FIG. 3, and generates the target construction information by subtracting ΔDPt from values of Zg of all the positions Pr (Xg, Yg, Zg) included in the data file EMD.

The example in FIG. 18 illustrates a construction example of mounting an object such as earth, sand, or rock on a range of a distance ΔADt from the surface OBS of the construction object OBP. In this case, the construction information generation device 52 obtains a position Ptb (Xtb, Ytb, Ztb) obtained by raising a position Prb (Xgb, Ygb, Zgb) of the surface OBS of the construction object OBP by the distance ΔADt. In the embodiment, the construction information generation device 52 moves the position Prb (Xgb, Ygb, Zgb) to a higher position by the distance ΔADt by adding ΔADt to Zg of the position Prb (Xgb, Ygb, Zgb). Therefore, the position Ptb (Xtb, Ytb, Ztb) becomes a position Ptb (Xgb, Ygb, Zgb+ΔADt). The position Ptb (Xtb, Ytb, Ztb) obtained in this manner becomes the target construction information. The construction information generation device 52 acquires the shape information, in the embodiment, the data file EMD from the detection processing device 51 illustrated in FIG. 3, and generates the target construction information by adding ΔADt to the values of Zg of all the positions Pr (Xg, Yg, Zg) included in the data file EMD.

In this manner, the construction illustrated in FIGS. 17 and 18 is construction to change (offset) the surface OBS of the object OBP to the fixed depth (ΔDpt) or the fixed height (ΔADt). Further, for example, the control system 50 may be applied to construction to provide a gradient having a predetermined inclination to the surface OBS of the construction object OBP. Such construction is carried out to make landform after construction be well-drained. After the detection processing device 51 generates the shape information on the basis of the images imaged by at least the pair of imaging devices 30, the construction information generation device 52 subtracts or adds a predetermined distance from or to the Zg coordinate of the position of the surface OBS indicated by the shape information to generate the target construction information provided with a predetermined gradient with respect to the surface OBS. In this case, the construction information generation device 52 changes the position of the surface OBS by processing the information indicating the position of the surface OBS of the construction object OBP included in the shape information, thereby to obtain the target construction information.

In a case where the construction site is wide, construction objects OBPa and OBPb imaged by at least the pair of imaging devices 30 may be a part of the construction object OBPt of the entire construction site, as illustrated in FIG. 19. Ranges OBPta and OBPtb having positions Pta and Ptb obtained from positions Pra and Prb on the surface of the construction objects OBPa and OBPb, as the target construction information, are also a part of the entire construction site. The construction management device 57 can obtain the amount of soil to be removed from the construction object OBP or the amount of soil to be mounted on the construction object OBP, using the difference between the shape information and the target construction information obtained from the shape information.

In a case where the construction management device 57 is provided in the management device 61 provided outside the excavator 1, for example, the construction management device 57 acquires the shape information from the excavator 1 via the communication device 25. The construction management device 57 obtains the amount of soil to be removed from the construction object OBP or the amount of soil to be mounted on the construction object OBP, using the difference between the acquired shape information and the target construction information obtained from the shape information. In this case, the construction management device 57 acquires the shape information from the excavator 1 and generates the target construction information. The construction management device 57 may acquire the shape information and the target construction information from the excavator 1 and obtain the amount of soil to be removed from the construction object OBP or the amount of soil to be mounted on the construction object OBP.

When the construction information generation device 52 generates the target construction information, the construction information generation device 52 stores the target construction information to its own storage unit. The target construction information stored in the storage unit of the construction information generation device 52 is used as a target value when the work device control device 56 executes the work device control. In the embodiment, the work device control device 56 controls the work device 2 of the excavator 1 such that the work device 2, more specifically, the cutting edge 8BT of the bucket 8 conforms to the target construction information. That is, the work device control device 56 moves the cutting edge 8BT of the bucket 8 along the shape targeted when the construction object is constructed, the shape being represented by the target construction information. The construction management device 57 may transmit the target construction information generated by the construction information generation device 52 from the communication device 25 to at least one of the management device 61, the mobile terminal device 64, and the another work machine 70 illustrated in FIG. 3. Next, a processing example of a shape measuring method and a construction managing method according to an embodiment will be described.

<Processing Example of Shape Measuring Method and Construction Managing Method According to Embodiment>

FIG. 20 is a flowchart illustrating a processing example of a shape measuring method and a construction managing method according to an embodiment. The excavator 1 having the control system 50 executes a shape measuring method according to the embodiment. More specifically, the control system 50 obtains the shape information of the construction object OBP, and generates the target construction information from the obtained shape information. The control system 50 then causes the work device 2 to conform to the obtained target construction information. The construction management system 100, in the embodiment, the management device 61 executes the construction managing method according to the embodiment.

When the imaging switch 32 illustrated in FIG. 3 is operated by the operator, the imaging command for causing the imaging devices 30 to image the construction object OBP is input from the imaging switch 32 to the detection processing device 51 of the control system 50. When the imaging command is input, the detection processing device 51 causes at least the pair of imaging devices 30 to image the construction object OBP in step S101. In step S102, the detection processing device 51 applies the image processing by the stereo method to the images imaged by at least the pair of imaging devices 30 to obtain the position (three-dimensional position) of the construction object OBP, and generates the shape information of the construction object OBP, using the obtained position of the construction object OBP. The detection processing device 51 stores the generated target construction information to at least one of its own storage unit and the storage unit 57M of the construction management device 57. The technique of generating shape information is as described above.

In step S103, the construction information generation device 52 acquires the shape information from the detection processing device 51, and generates the target construction information. The construction information generation device 52 stores the generated target construction information to at least one of its own storage unit and the storage unit 57M of the construction management device 57. The technique of generating the target construction information is as described above. In the embodiment, the construction management device 57 illustrated in FIG. 3 may transmit the work information LG including the shape information obtained in step S102 and the target construction information obtained in step S102 to at least one of the management device 61 and the mobile terminal device 64.

In step S104, the excavator 1 constructs the construction object OBP. At this time, the work device control device 56 executes the work device control. That is, the work device control device 56 moves the cutting edge 8BT of the bucket 8 along the shape targeted at the time of construction of the construction object OBP, the shape being represented by the target construction information.

In the embodiment, the excavator 1 executes the work device control on the basis of the target construction information to perform construction. At the construction site, the operator sometimes performs excavation and the like by hand, using a work implement such as a scoop. In such a case, the operator may confirm the target construction information transmitted from the excavator 1 and acquired by the mobile terminal device 64 and perform construction such as excavation.

When the construction is completed, the detection processing device 51 causes at least the pair of imaging devices 30 to image the construction object OBP after construction and generates the shape information, using the obtained images in step S105. Next, in step S106, the construction management device 57 transmits the shape information after construction generated by the detection processing device 51 to the management device 61 via the communication device 25 illustrated in FIG. 3. The construction management device 57 may transmit the shape information after construction to the mobile terminal device 64 illustrated in FIG. 3 via the communication device 25. The management device 61 that has acquired the shape information after construction may transmit the shape information after construction to the mobile terminal device 64 illustrated in FIG. 3 via the communication device 62. In the flowchart illustrating the processing example of the construction method illustrated in FIG. 20, steps S106 and S107 may not be executed.

In the embodiment, since the time information TM is added to the shape information, at least one of the management device 61 and the mobile terminal device 64 displays the shape information before and after construction about a predetermined construction site, which has been transmitted from the control system 50, on the screen of at least one of the display device 67 and the display device of the mobile terminal device 64, thereby to display the progress of the construction. Further, at least one of the management device 61 and the mobile terminal device 64 chronologically arranges and displays the shape information of the construction site on at least one of the display device 67 and the display device of the mobile terminal device 64, displays the shape information by frame advance, or displays numerical values of the coordinates of the position Pr, thereby to display the progress of daily construction in an easy-to-understand manner. If the construction management device 57 of the excavator 1 obtains time-series shape information of the construction site from the management device 61, the construction management device 57 of the excavator 1 can chronologically arrange and display the shape information of the construction site on the screen 58D of the display device 58. That is, at least one of the management device 61, the mobile terminal device 64, the construction management device, and the construction management device 57 includes a display device that chronologically displays information of a landform of the entire construction site of the work machine, using a plurality of pieces of the shape information to which the time information is attached.

In the embodiment, the construction management device 57 may transmit the target construction information to at least one of the management device 61 and the mobile terminal device 64 via the communication device 25, in addition to the shape information after construction. When the shape information after construction and the target construction information are transmitted from the excavator 1 to only the management device 61, the management device 61 may transmit the shape information after construction and the target construction information to the mobile terminal device 64 via the communication device 62. In doing so, at least one of the management device 61 and the mobile terminal device 64 can display the shape information after construction and the target construction information side by side on the screen of the display device 67, or can superimpose and display the information. Therefore, the administrator or the like can promptly and easily confirm the progress of construction.

<Modification of Method for Detecting Object>

A modification of a method for detecting an object by at least a pair of imaging devices 30 included an excavator 1 will be described. At least the pair of imaging devices 30 is attached to a swing body 3 of the excavator 1. A detection processing device 51 can acquire shape information of entire surroundings of the excavator 1 as at least the pair of imaging devices 30 images the object while the swing body 3 swings.

In a case where at least the pair of imaging devices 30 images the object while the swing body 3 swings, the detection processing device 51 may stop the swing of the swing body 3 at imaging timing. In this case, the swing body 3 intermittently swings. In a case where at least the pair of imaging devices 30 images the object while the swing body 3 continuously swings, the following process is performed.

In the case where at least the pair of imaging devices 30 images the object while the swing body 3 continuously swings, at least the pair of imaging devices 30 starts imaging at the same time as the swing body 3 starts to swing, and terminates the imaging as the swing is stopped. Then, the detection processing device 51 may apply image processing in a stereo method on the basis of the images acquired during swing of the swing body 3 to obtain the shape information. In this case, the detection processing device 51 receives a signal or an electrical signal indicating change of a pilot pressure, which is output with an operation of an operation device for causing the swing body 3 to swing, of an operation device 35, determines timing of start and stop of the swing of the swing body 3, and causes at least the pair of imaging devices 30 to perform imaging.

In a case where three-dimensional measurement by imaging the object by the imaging devices 30 during swing of the swing body 3 is executed, the detection processing device 51 generates time information TM every time a shutter of the imaging device 30 is released and associates the time information TM with the imaged image. Further, the detection processing device 51 may set the time when swing of the swing body 3 is started, or the time when the swing is stopped as the time information TM.

Since the control system 50 associates the shape information of the object imaged by at least the pair of imaging devices 30 with the time information when the shape information is obtained, a current situation of a construction site can be obtained in combination of the shape information on the basis of the time information.

Work machines like the excavator 1 often perform construction on a complicated landform and are often greatly inclined with respect to the object to be imaged by the imaging devices 30. In a case where the object is imaged at the same place at different timing, change of the inclination of the ground of the place is expected due to construction or the like. Since the pair of imaging devices 30 is reliably attached to the excavator 1 so that the relative positional relationship between the pair of imaging devices 30 is not shifted while the excavator 1 is operated, change of posture of the pair of imaging devices 30 according to the posture of the excavator 1 is difficult.

In the embodiment, the control system 50 obtains the shape information, using the posture of the excavator. At this time, the control system 50 converts the three-dimensional information obtained by the imaging devices 30 into three-dimensional information in the global coordinate system, using the detection value of the IMU 24 and the azimuth of the excavator obtained from the position of the excavator 1 detected by the position detection device 23. The three-dimensional position information after conversion becomes the shape information. With such processing, the shape information obtained by the control system 50 enables control of influence of the inclination of the excavator 1 and appropriate comparison of the landform before construction and the like.

The control system 50 can acquire the shape information of the work site, that is, the three-dimensional position information of the work site, by imaging the work site by the imaging devices 30. Since the control system 50 is provided in the excavator 1, the control system 50 can obtain the shape information while being moved to various places in the work site. A situation of the work site and change of the situation of the work site can be grasped by combining a plurality of pieces of the shape information obtained in the aforementioned manner on the basis of the time information. As a result, the management device 61 can manage a construction situation, using a detection result obtained by the excavator 1 as a work machine including at least the pair of imaging devices 30 as detection devices that detect the position of the object and the detection processing device 51.

For example, the management device 61 can obtain a construction state of the construction site within a range that can be regarded as the same time by extracting and combining a plurality of different pieces of the shape information obtained within the range that can be regarded as the same time. For example, progress of construction is grasped by obtaining a plurality of construction states of the construction site within the range that can be regarded as the same time. As described above, the management device 61 can manage the construction situation of the construction site where the work machine including the imaging devices 30 and the detection processing device 51, and a work machine not including the imaging devices 30 and the detection processing device 51 coexist. As described above, if there is one excavator 1 having the control system 50 at the work site, the excavator 1 can generate the shape information of not only its own construction object but also a construction object of another work machine. Therefore, progress control and performance control of the construction in the entire construction site become possible.

The control system 50 detects a construction object, using at least the pair of imaging devices 30 provided in the excavator 1, obtains the shape information of the construction object from at least a pair of images that are detection results, and obtains the shape information that is information on a shape targeted when the object is constructed from the obtained shape information. Therefore, the control system 50 makes work to survey the construction object, using surveying instrument or the like, to obtain the shape of the object, performed at the construction site by the operator unnecessary, and work to generate a target shape on the basis of an obtained construction object, that is, work to design information of the target shape unnecessary. As a result, the control system 50 can reduce the trouble of surveying the current landform of the construction object and the trouble of obtaining the shape targeted at the time of construction of the construction object. The control system 50 can generate the target construction information of a place where survey using surveying instrument or the like is difficult as long as the imaging devices 30 can image the place. Therefore, construction by a work machine and construction such as excavation by hand of the operator can be more efficiently realized. Further, the construction object can be surveyed by the control system 50, and the burden on the operator who performs survey at the construction site can be reduced.

For example, in a case where the target construction information of the construction object created by a design tool such as a computer aided design (CAD) exists, a work machine may need to be moved to a place indicated by the target construction information, that is, a place to be constructed, in order to perform construction by the work machine. The excavator 1 having the control system 50 includes at least the pair of imaging devices 30, and images the construction object to be constructed by at least the pair of imaging devices 30 and generates the target construction information on the basis of an imaging result. The excavator 1 functions as surveying instrument and also as a design tool. That is, since the target construction information of the construction object can be generated at the place of construction, the excavator does not need to be moved to the place to be constructed. As a result, travel time and a design period can be shortened, and thus work efficiency is improved.

In the embodiment, the control system of the excavator 1 generates the shape information. However, the management device 61 may generate the shape information. In this cape, information necessary for obtaining the shape information, such as a result of image processing by a stereo method applied to the images imaged by the pair of imaging devices 30, information indicating the posture of the excavator 1, and the position of the excavator 1 in the global coordinate system is transmitted to the management device 61 via the communication device 25.

Since the work machine such as the excavator 1 is moved at the construction site, inclination of the site imaged by at least the pair of imaging devices 30 varies, and inclination of a place to be imaged may also change with the passage of time due to construction. Even in such a construction site, the control system 50 generates the shape information, using the information representing the posture of the excavator 1, in the embodiment, the roll angle $\theta r$, the pitch angle $\theta p$, and the azimuth angle $\theta d$. Therefore, appropriate construction management can be realized.

In the embodiment, the control system 50 generates the shape information, using the roll angle $\theta r$, the pitch angle $\theta p$, and the azimuth angle $\theta d$ that represent the posture of the excavator 1. However, the pair of imaging devices 30 may be supported by a mechanism to keep the postures of the excavator 1 and the imaging devices 30 constant while keeping the relative positional relationship of the pair of imaging devices 30 with respect to posture change of the excavator 1. In this case, for example, the pair of imaging devices 30 is supported by a mechanism that keeps a base line of the pair of imaging devices 30 horizontal on a constant basis.

In the embodiment, the control system 50 generates the shape information of the range to be constructed by the excavator 1 having the control system 50 and the work machine not having the control system 50 and the range after construction. However, the range of which the shape information is generated by the control system 50 is not limited thereto. For example, the control system 50 can generate the shape information of a range constructed by the operator who performs work such as excavation with a scoop or the like at the construction site, and the shape information of the range to be constructed. In doing so, the control system 50 and the construction management system 100 having the control system 50 can control the construction situation of the entire construction site. As described above, the control system 50 can also obtain the amount of soil excavated or mounted by the operator with a scoop or the like from the difference in the shape information before and after construction.

In the embodiment, the control system 50 is provided in the excavator 1 as a work machine. However, a system to generate the shape information and the target construction information may be provided in a survey vehicle. For example, in a case of generating the shape information, at least the pair of imaging devices 30 and the detection processing device 51 are provided in the survey vehicle. In a case of generating the target construction information in addition to the shape information, the construction information generation device 52 is provided in the survey vehicle in addition to at least the pair of imaging devices 30 and the detection processing device 51. In either case, the survey vehicle has favorably a communication device 25 that can communicate with at least one of a work machine working on the construction site, the management device 61, and the mobile terminal device 64.

In the embodiment, the image processing by the stereo method may be performed by at least one of the management device 61 of the management facility 60 and the mobile terminal device 64 outside the excavator 1, for example. In this case, for example, a pair of images of the object imaged by at least the pair of imaging devices 30 is transmitted to at least one of the management device 61 and the mobile terminal device 64 via the communication device 25, and at least one of the management device 61 and the mobile terminal device 64 applies the image processing by the stereo method to the object images.

In the embodiment, at least one of the management device 61 of the management facility 60 and the mobile terminal device 64 outside the excavator 1 may generate the shape information. In particular, at least one of the management device 61 of the management facility 60 and the mobile terminal device 64 outside the excavator 1 may perform conversion using the roll angle $\theta r$, the pitch angle $\theta p$, and the azimuth angle $\theta d$ representing the posture of the excavator 1. In this case, information of a pair of images of the object imaged by at least the pair of imaging devices 30, to which the image processing by the stereo method has been applied, is transmitted together with the roll angle $\theta r$, the pitch angle $\theta p$, and the azimuth angle $\theta d$ to at least one of the management device 61 of the management facility 60 and the mobile terminal device 64 outside the excavator 1 via the communication device 25.

In the embodiment, first, the position Ps of the construction object OBP obtained from the images imaged by at least the pair of imaging devices 30 is obtained and then the position Ps is converted into the position Pg in the global coordinate system, and inclination due to the posture of the excavator may be corrected. In the embodiment, when the IMU 24 detects at least one of the swing of the swing body 3 of the excavator 1 and movement of the excavator 1, for example, the control system 50 may execute control to prohibit imaging by the imaging devices 30 and not to allow the detection processing device 51 to generate the shape information. In the embodiment, the excavator 1 may transmit the shape information to the another work machine 70, and the another work machine 70 may generate the target construction information.

The embodiments have been described above. However, the embodiments are not limited by the content described above. In addition, the above-mentioned configuration elements include elements that can be easily conceived by those skilled in the art, elements substantially the same, and elements that are so-called equivalents. The above-described configuration elements can be appropriately combined. At least one of various omissions, substitutions, and changes of the configuration elements can be made without departing from the gist of the embodiments. The work machine is not limited to the excavator as long as the work machine can construct the construction object, for example, perform excavation, transportation, and the like, and may be a work machine such as a wheel loader and a bulldozer.

REFERENCE SIGNS LIST

1 EXCAVATOR
2 WORK DEVICE
3 SWING BODY
4 DRIVER'S CAB
5 TRAVELING BODY
21, 22 ANTENNA
23 POSITION DETECTION DEVICE
25 COMMUNICATION DEVICE
30, 30a, 30b, 30c, 30d IMAGING DEVICE
32 IMAGING SWITCH
50 CONTROL SYSTEM OF WORK MACHINE
51 DETECTION PROCESSING DEVICE
51A CALCULATION UNIT
51B INFORMATION PROVIDING UNIT
52 CONSTRUCTION INFORMATION GENERATION DEVICE
53 SENSOR CONTROL DEVICE
54 ENGINE CONTROL DEVICE
55 PUMP CONTROL DEVICE
56 WORK DEVICE CONTROL DEVICE
57 CONSTRUCTION MANAGEMENT DEVICE
57M STORAGE UNIT
58 DISPLAY DEVICE
59 SIGNAL LINE
60 MANAGEMENT FACILITY
61 MANAGEMENT DEVICE
62 COMMUNICATION DEVICE
64 MOBILE TERMINAL DEVICE
67 DISPLAY DEVICE
70 ANOTHER WORK MACHINE
100 CONSTRUCTION MANAGEMENT SYSTEM
EMD DATA FILE
ID POSTURE INFORMATION
LG WORK INFORMATION
NTW COMMUNICATION LINE
OBP CONSTRUCTION OBJECT
PR PROCESSING UNIT
MR STORAGE UNIT
IO INPUT/OUTPUT UNIT
TM TIME INFORMATION

The invention claimed is:

1. A construction management system comprising:
   an object detection unit implemented in a detecting device attached to a work machine and configured to detect an object and output information of the object;
   a shape detection unit implemented in a processor mounted on the work machine and configured to output shape information representing a three-dimensional shape of the object by using the information of the object detected by the object detection unit;
   an information providing unit implemented in the processor mounted on the work machine and configured to provide time information used for identifying the shape information; and
   a management device capable of communicating with the work machine and configured to acquire a plurality of the shape information corresponding to the place on the work site to which time information have been provided respectively and generate current state information indicating a current situation of the object by using a plurality of the shape information corresponding to the place on the work site, wherein
   in a case where there is more than one shape information indicating the same place among a plurality of the shape information corresponding to the place on the work site when the management device generates the current state information by using a plurality of the shape information corresponding to the place on the work site, the management device is configured to compare the time information attaching to the shape information indicating the same place respectively, determine the shape information indicating the place to which the latest time information has been provided from the shape information indicating the same place, and generate the current state information by using the shape information indicating the place to which the latest time information has been provided as the shape information corresponding to the place.

2. The construction management system according to claim 1, wherein
   the time information includes information of at least one time existing from a time when the object has been detected by the object detection unit to a time when an external device of the work machine has acquired the output shape information.

3. The construction management system according to claim 1, wherein
   the information providing unit is configured to further output information indicating a position of the object detection unit and information for identifying the object detection unit.

4. The construction management system according to claim 1, wherein the shape detection unit and the information providing unit are provided in the work machine.

5. The construction management system according to claim 1, wherein
   the work machine includes a posture detection unit configured to output a posture of the work machine, and the shape detection unit and the object detection unit are attached to the work machine, and the shape information is obtained by using the posture of the work machine of when the object detection unit has detected the object, the posture having been detected by the posture detection unit.

6. The construction management system according to claim 1, wherein
the work machine includes a position detection unit configured to detect an azimuth of the work machine, and
the shape detection unit is configured to obtain the shape information by further using the azimuth of the work machine of when the shape detection unit has detected the object, the azimuth having been detected by the position detection unit.

7. The construction management system according to claim 1, wherein information of a landform of a current situation of an entire construction site of the work machine is output by using the shape information to which the time information is attached.

8. The construction management system according to claim 1, further comprising: a display device configured to chronologically display information of a landform of an entire construction site of the work machine by using a plurality of pieces of the shape information to which the time information is attached.

9. The construction management system according to claim 1, wherein the management device is configured to generate the current state information by using a plurality of pieces of the shape information.

10. The construction management system according to claim 1, wherein
a shape measuring system comprises the object detection unit, the shape detection unit, and the information providing unit, and
the management device is configured to acquire the shape information from a plurality of the shape measuring systems to generate the current state information.

11. A construction management system comprising:
an object detection unit implemented in a detecting device attached to a work machine and configured to detect an object and output information of the object;
a shape detection unit implemented in a processor mounted on the work machine and configured to output shape information representing a three-dimensional shape of the object by using the information of the object detected by the object detection unit;
an information providing unit implemented in the processor mounted on the work machine and configured to provide time information used for identifying the shape information; and
a management device capable of communicating with the work machine and configured to acquire the shape information a plurality of the shape information corresponding to the place on the work site to which time information have been provided respectively and generate current state information indicating a current situation of the object by using a plurality of the shape information corresponding to the place on the work site, wherein the management device is configured to combine pieces of the shape information having the same time information or the time information regarded as the same, and
in a case where there is more than one shape information indicating the same place among a plurality of the shape information corresponding to the place on the work site when the management device generates the current state information by using a plurality of the shape information corresponding to the place on the work site, the management device is further configured to compare the time information attaching to the shape information indicating the same place respectively, determine the shape information indicating the place to which the latest time information has been provided from the shape information indicating the same place, and generate the current state information by using the shape information indicating the place to which the latest time information has been provided as the shape information corresponding to the place.

12. A construction management system comprising:
an object detection unit implemented in a detecting device attached to a work machine and configured to detect an object and output information of the object;
a shape detection unit implemented in a processor mounted on the work machine and configured to output shape information representing a three-dimensional shape of the object by using the information of the object detected by the object detection unit;
an information providing unit implemented in the processor mounted on the work machine and configured to provide time information used for identifying the shape information;
a management device capable of communicating with the work machine and configured to acquire a plurality of the shape information corresponding to the place on the work site to which time information have been provided respectively and generate current state information indicating a current situation of the object by using a plurality of the shape information corresponding to the place on the work site; and
a display device configured to display the current state information, wherein
the display device is configured to chronologically arrange and display the current state information, or display the current state information by frame advance in every time, and
in a case where there is more than one shape information indicating the same place among a plurality of the shape information corresponding to the place on the work site when the management device generates the current state information by using a plurality of the shape information corresponding to the place on the work site, the management device is configured to compare the time information attaching to the shape information indicating the same place respectively, determine the shape information indicating the place to which the latest time information has been provided from the shape information indicating the same place, and generate the current state information by using the shape information indicating the place to which the latest time information has been provided as the shape information corresponding to the place.

* * * * *